(12) United States Patent
Rambaud

(10) Patent No.: US 10,183,543 B2
(45) Date of Patent: Jan. 22, 2019

(54) VEHICLE HAVING A CHASSIS AND A PENDULUM NACELLE

(71) Applicant: SWINCAR, Allan (FR)

(72) Inventor: Pascal Rambaud, Allan (FR)

(73) Assignee: SWINCAR, Allan (FR)

( * ) Notice: Subject to any disclaimer, the term of this patent is extended or adjusted under 35 U.S.C. 154(b) by 0 days.

(21) Appl. No.: 15/304,700

(22) PCT Filed: Mar. 27, 2015

(86) PCT No.: PCT/FR2015/050799
§ 371 (c)(1),
(2) Date: Oct. 17, 2016

(87) PCT Pub. No.: WO2015/158976
PCT Pub. Date: Oct. 22, 2015

(65) Prior Publication Data
US 2017/0043643 A1   Feb. 16, 2017

(30) Foreign Application Priority Data

Apr. 17, 2014   (FR) ...................................... 14 53513

(51) Int. Cl.
*B60G 3/14*   (2006.01)
*B60G 99/00*   (2010.01)
(Continued)

(52) U.S. Cl.
CPC ............. *B60G 99/002* (2013.01); *B60G 3/14* (2013.01); *B60G 7/008* (2013.01); *B60G 7/02* (2013.01);
(Continued)

(58) Field of Classification Search
CPC .. A61G 1/048; B60G 2300/45; B60G 99/002; B60G 3/14; B62B 2301/14
See application file for complete search history.

(56) References Cited

U.S. PATENT DOCUMENTS 5,794,955 A * 8/1998 Flynn ..................... A63C 17/01
                                                         280/11.28
2004/0195787 A1   10/2004 Twitchell
2007/0267883 A1   11/2007 Tsai

FOREIGN PATENT DOCUMENTS

FR    2187370 A1    1/1974
FR    2522590 A1    9/1983
(Continued)

OTHER PUBLICATIONS

"Swincar Electrique"; Dated: Oct. 28, 2012, XP054975631.
(Continued)

*Primary Examiner* — Bryan A Evans
(74) *Attorney, Agent, or Firm* — Cantor Colburn LLP

(57) ABSTRACT

The vehicle includes: a chassis which includes a front cross-member and a rear cross-member; a nacelle receiving a person or a load, pivotally mounted relative to the central part of the cross-members about a substantially longitudinal hinge axis, the center of gravity of the nacelle being situated below said hinge axis; a front train and a rear train, each including two movement supports on the ground, each movement support being connected to the end part of the corresponding cross-member by a connecting system; the cross-members, situated in the upper part of the nacelle, being separate pieces linked together only by the nacelle, via the hinge axis, so as to be able to pivot about the hinge axis independently of one another.

20 Claims, 16 Drawing Sheets

(51) Int. Cl.
  *B60G 21/00* (2006.01)
  *B60G 7/00* (2006.01)
  *B60G 7/02* (2006.01)
  *B60K 1/02* (2006.01)
  *B60K 1/04* (2006.01)
  *B62B 13/18* (2006.01)
  *B62D 9/02* (2006.01)
  *B62D 9/04* (2006.01)
  *B62D 21/11* (2006.01)

(52) U.S. Cl.
  CPC .............. *B60G 21/007* (2013.01); *B60K 1/02* (2013.01); *B60K 1/04* (2013.01); *B62B 13/18* (2013.01); *B62D 9/02* (2013.01); *B62D 9/04* (2013.01); *B62D 21/11* (2013.01); *B60G 2200/44* (2013.01); *B60G 2204/148* (2013.01); *B60G 2204/182* (2013.01); *B60G 2300/07* (2013.01); *B60G 2300/322* (2013.01); *B60G 2300/45* (2013.01); *B60G 2300/50* (2013.01); *B60K 2001/045* (2013.01); *B62B 2205/10* (2013.01); *B62B 2206/006* (2013.01); *B62B 2301/02* (2013.01)

(56) References Cited

FOREIGN PATENT DOCUMENTS

| | | |
|---|---|---|
| FR | 2542686 A1 | 9/1984 |
| WO | 2006129020 A1 | 12/2006 |
| WO | 2014041210 A2 | 3/2014 |

OTHER PUBLICATIONS

FR2522590 English Abstract.
International Search Report for Application No. PCT/FR2015/050799.

\* cited by examiner

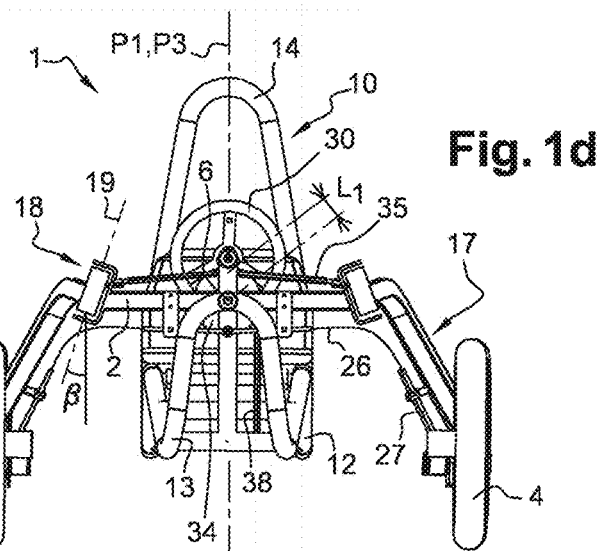
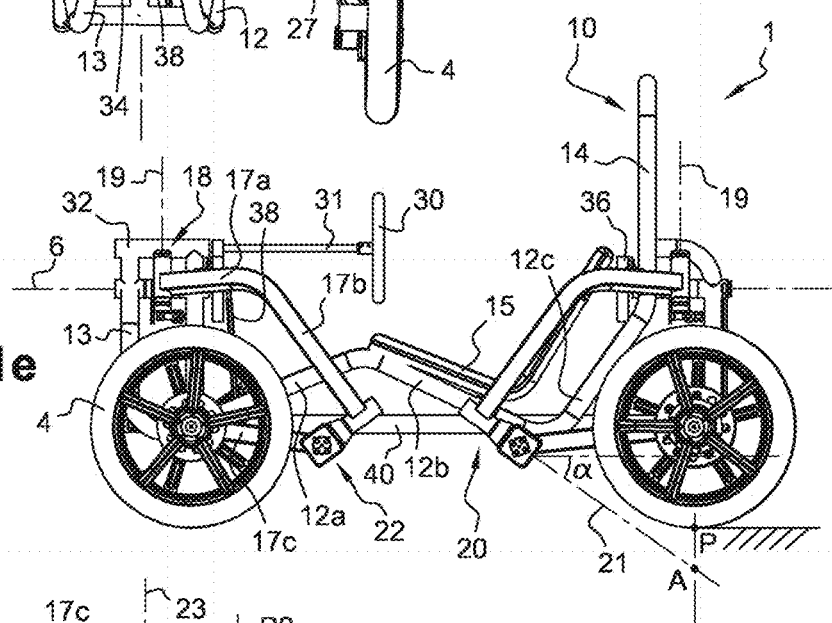
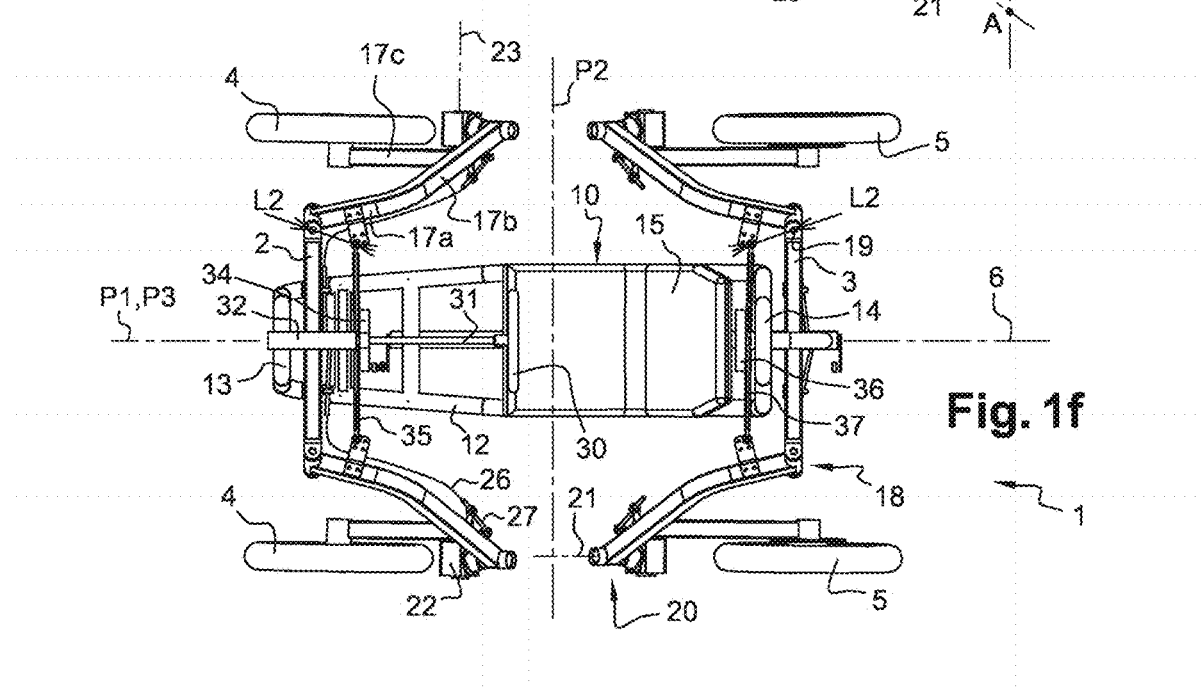
Fig. 1d
Fig. 1e
Fig. 1f

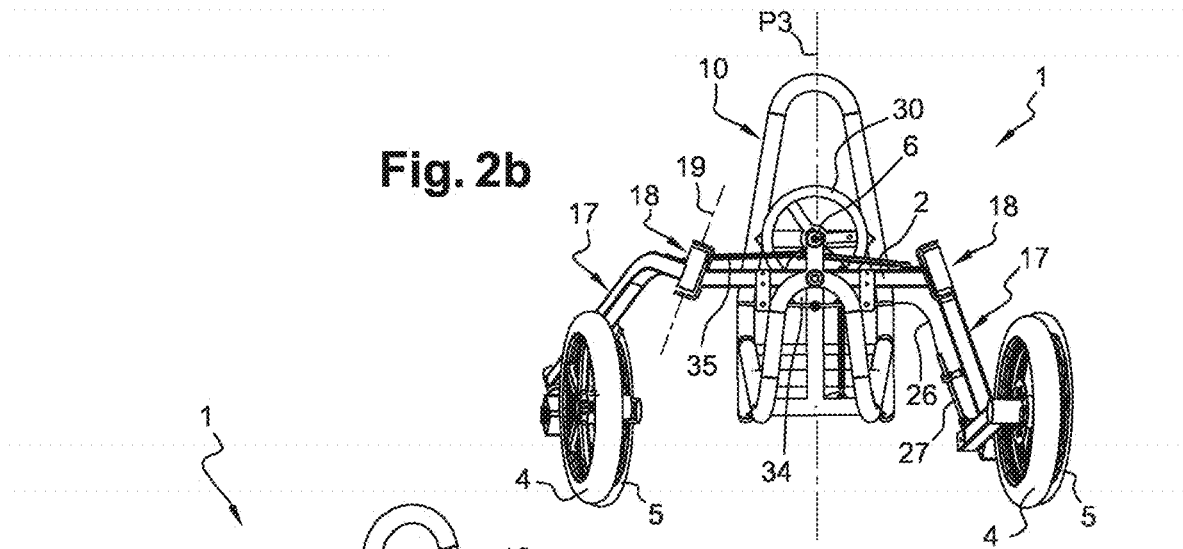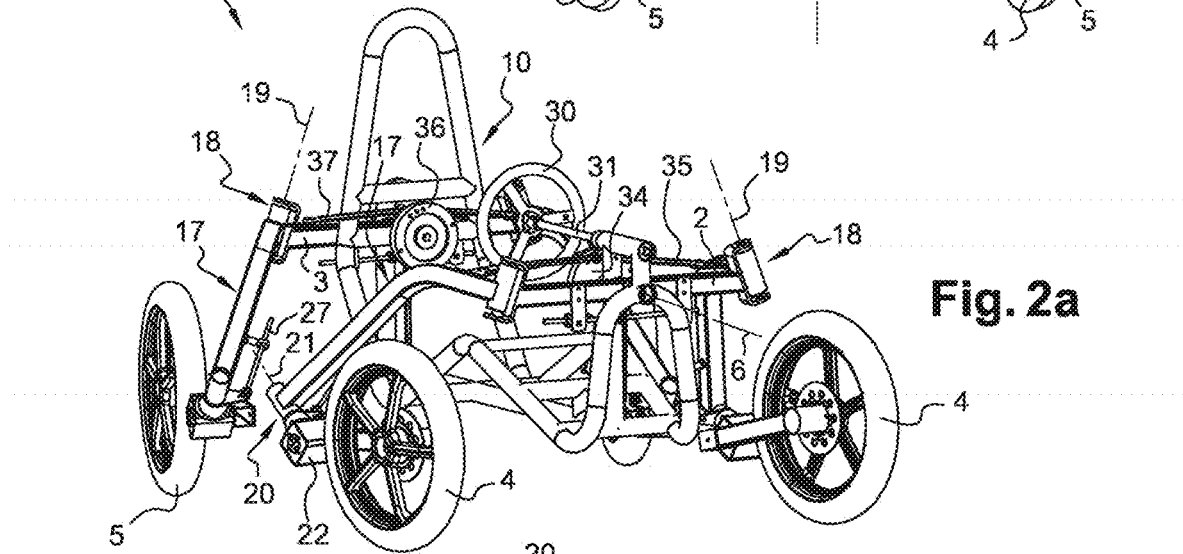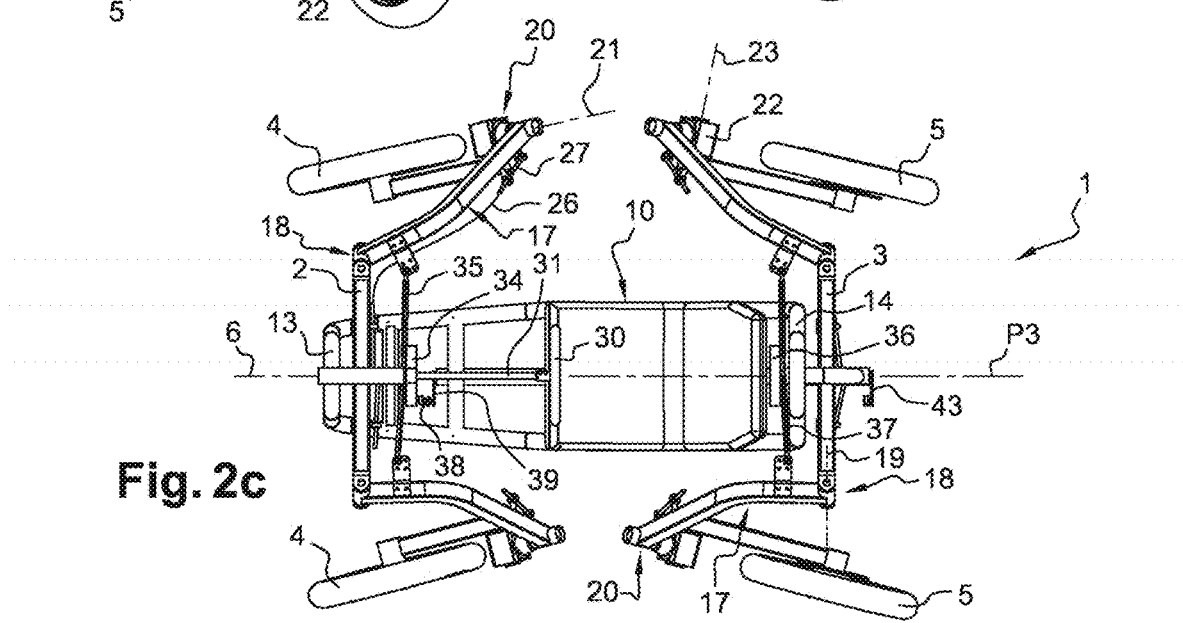

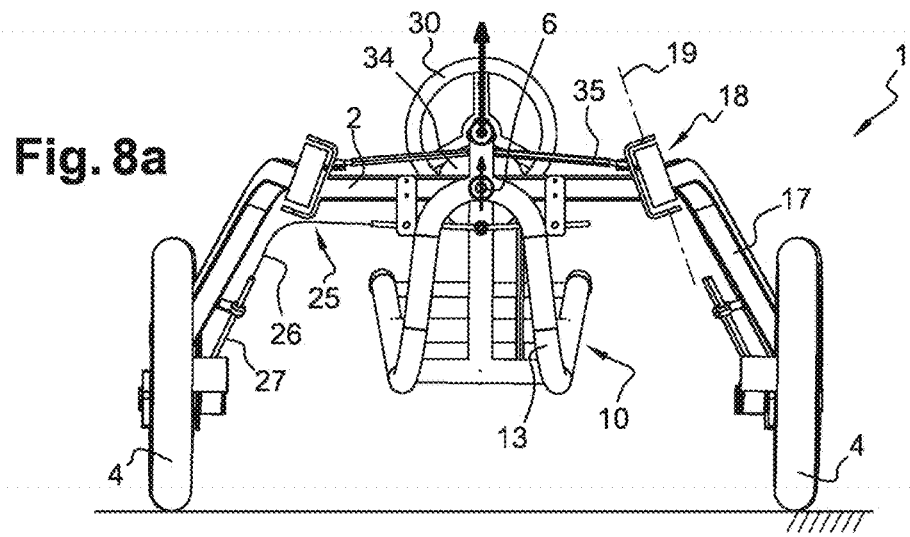
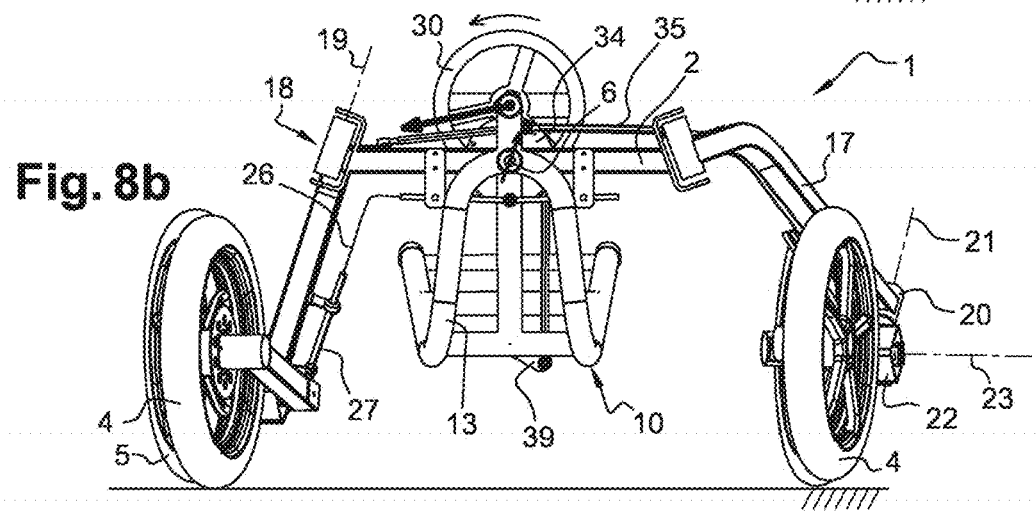
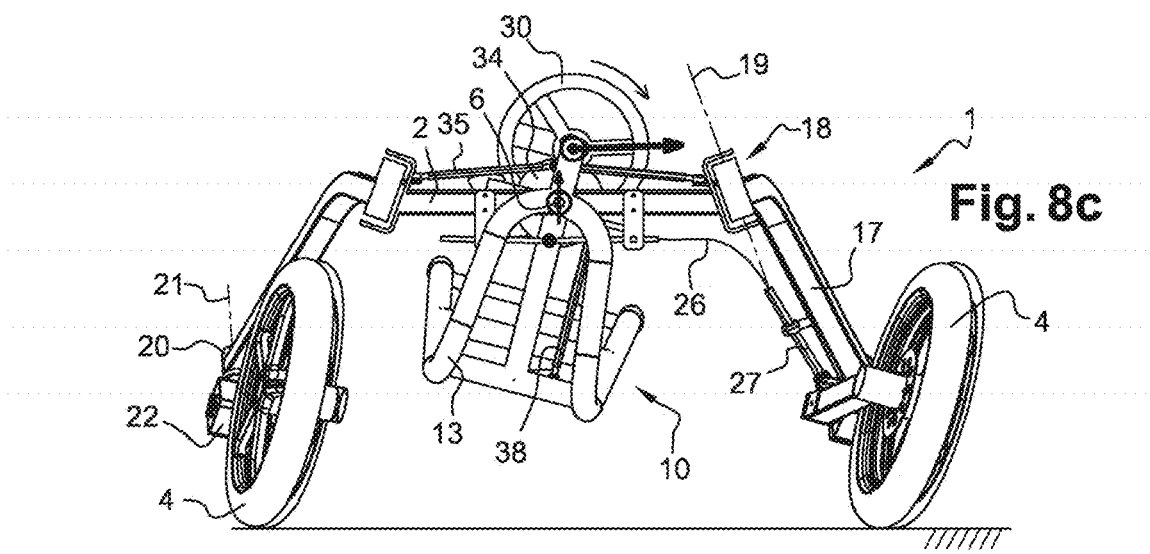

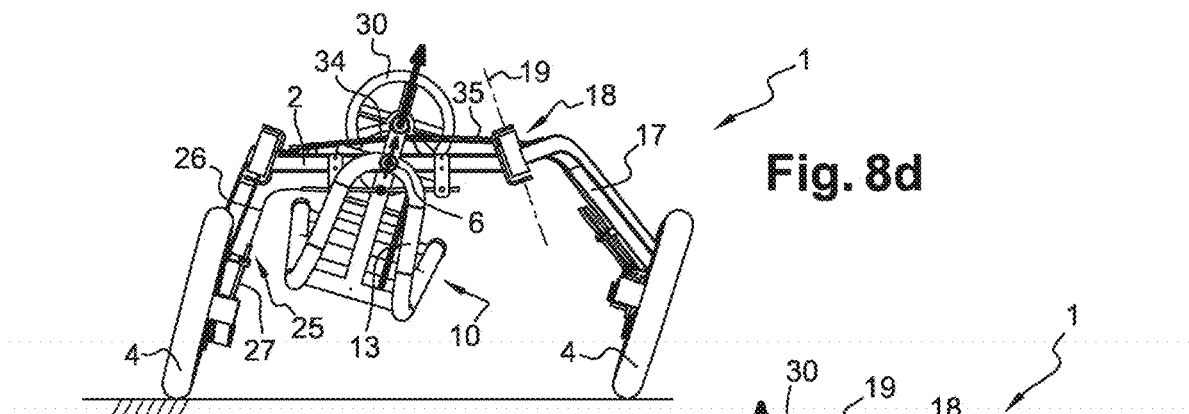
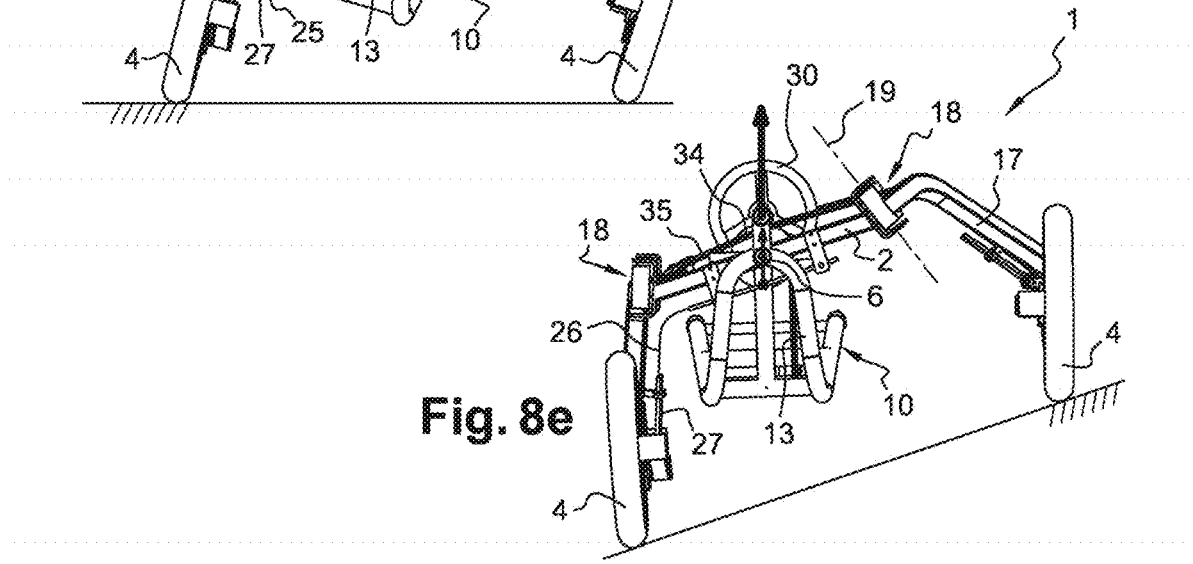
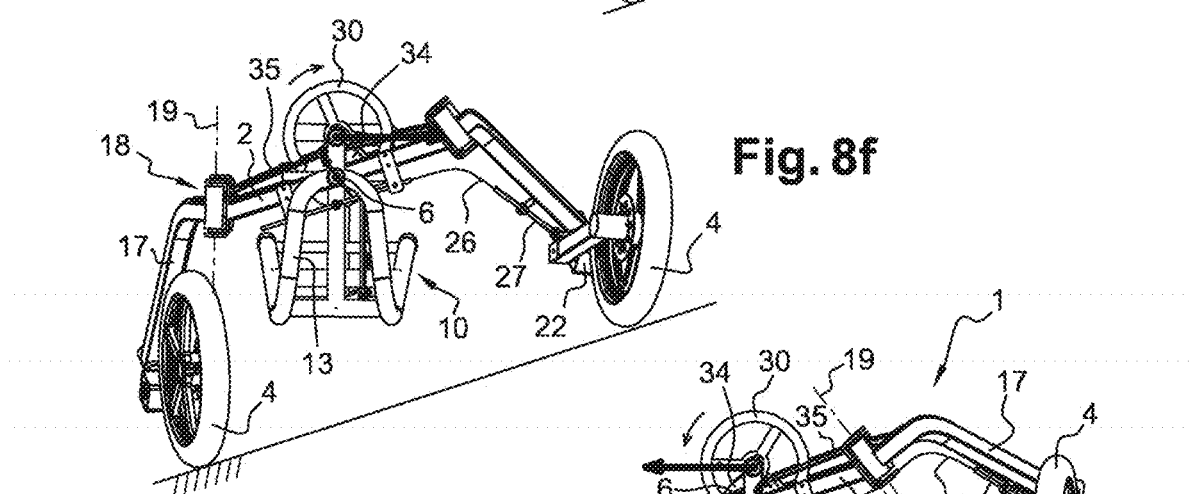
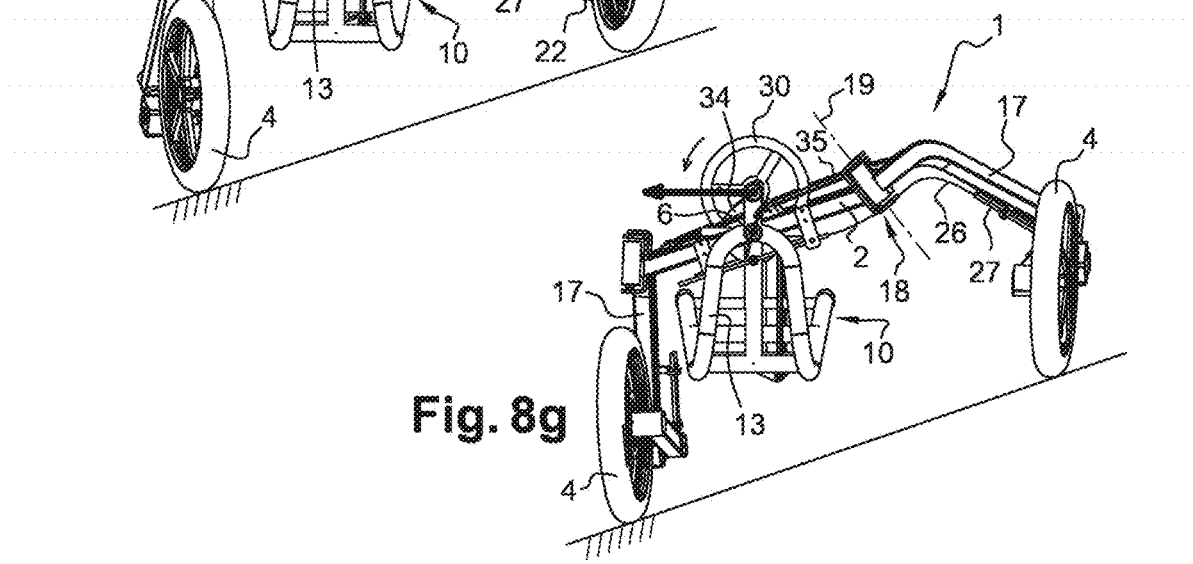

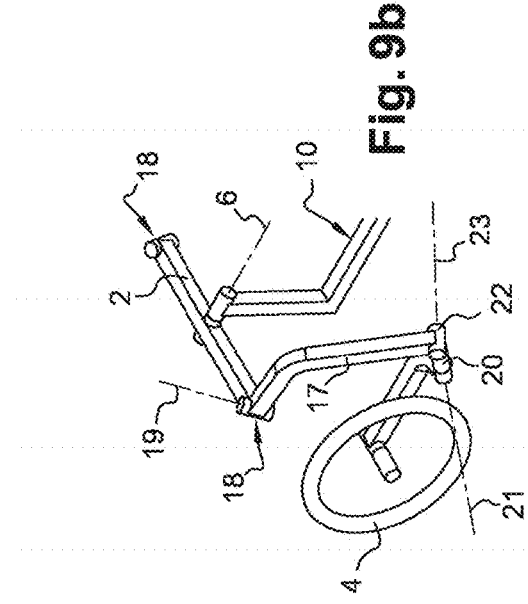
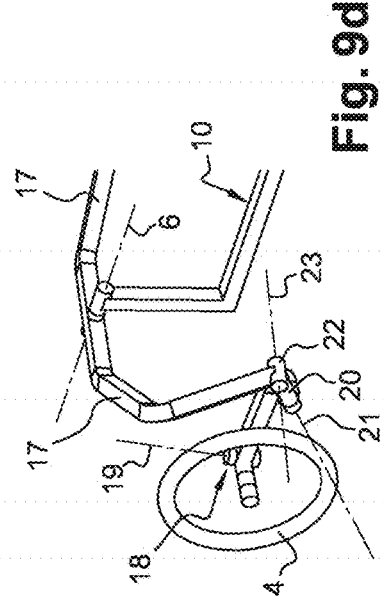
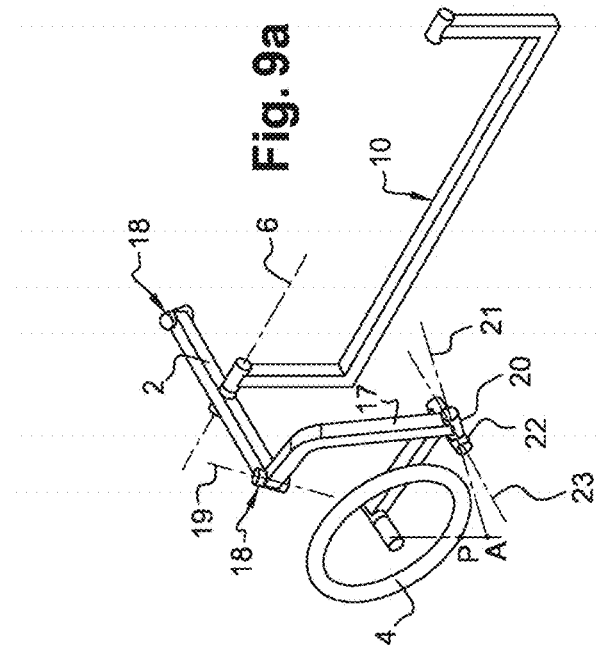
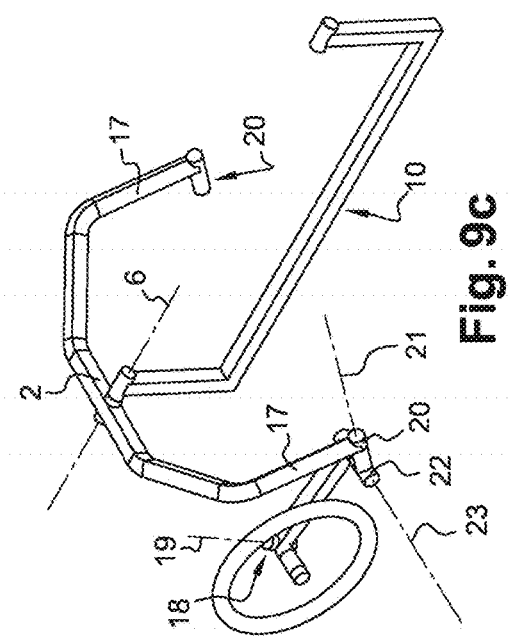

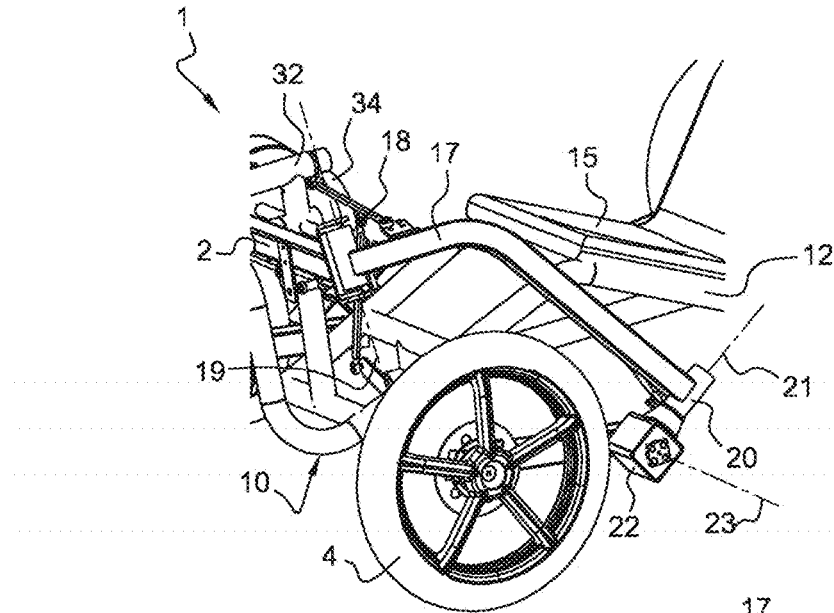
Fig. 10a
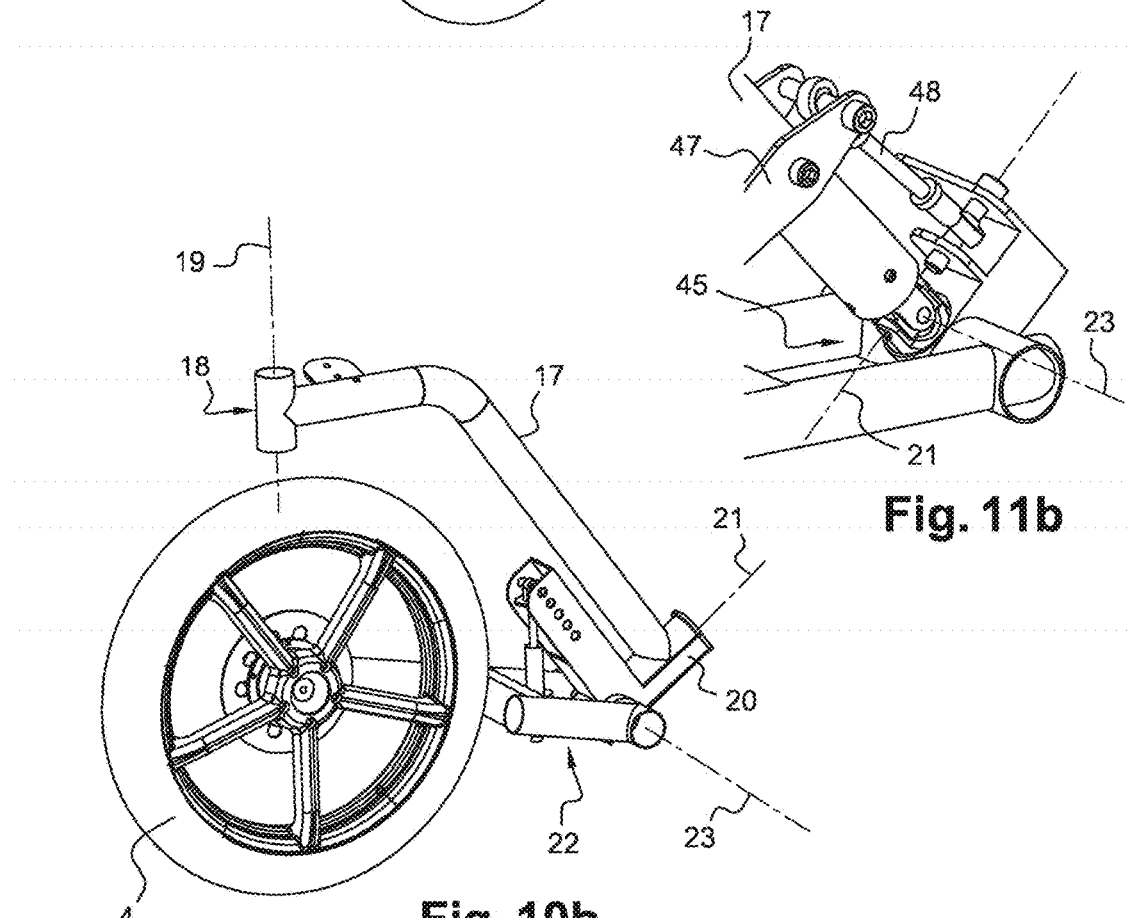
Fig. 11b
Fig. 10b

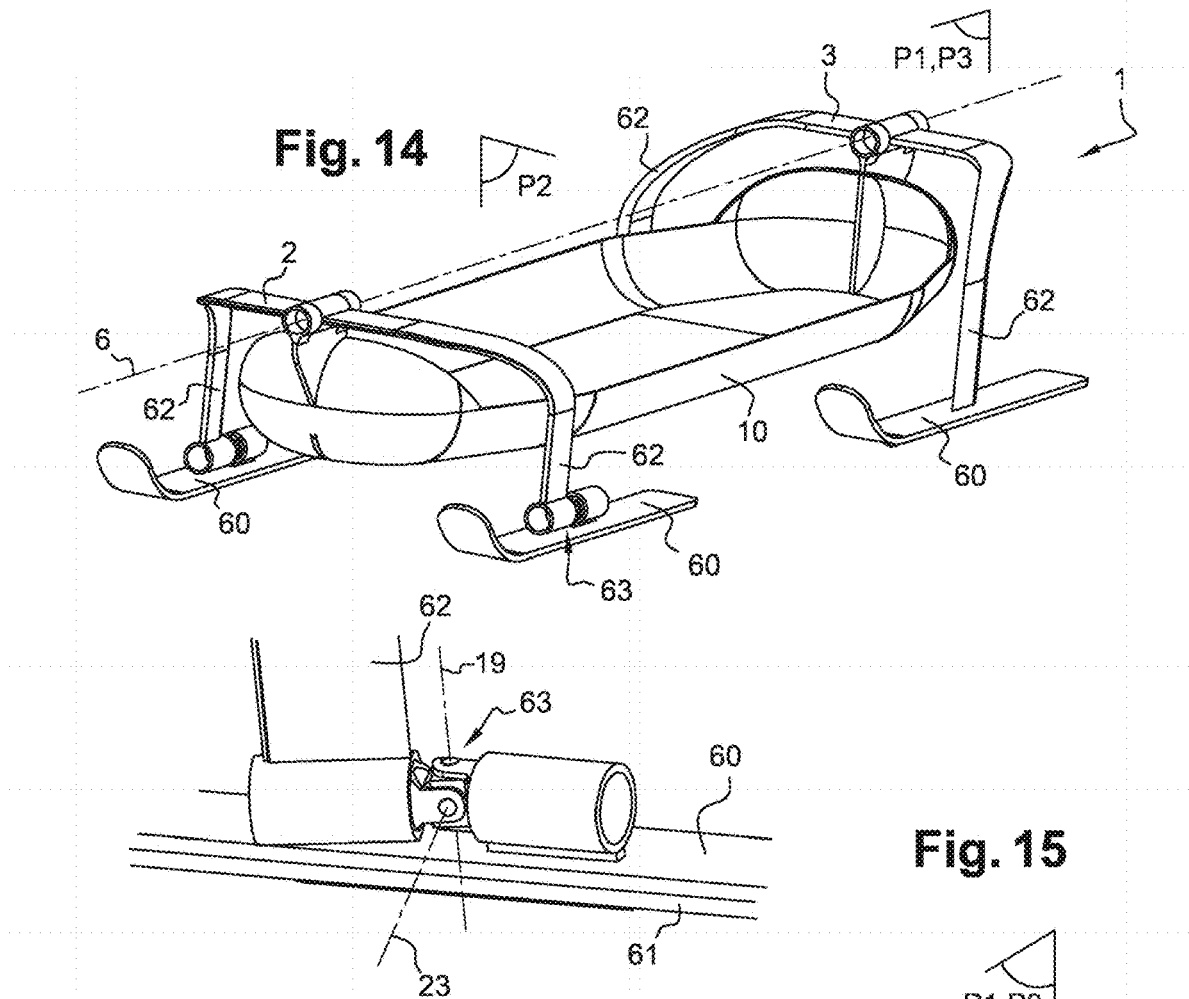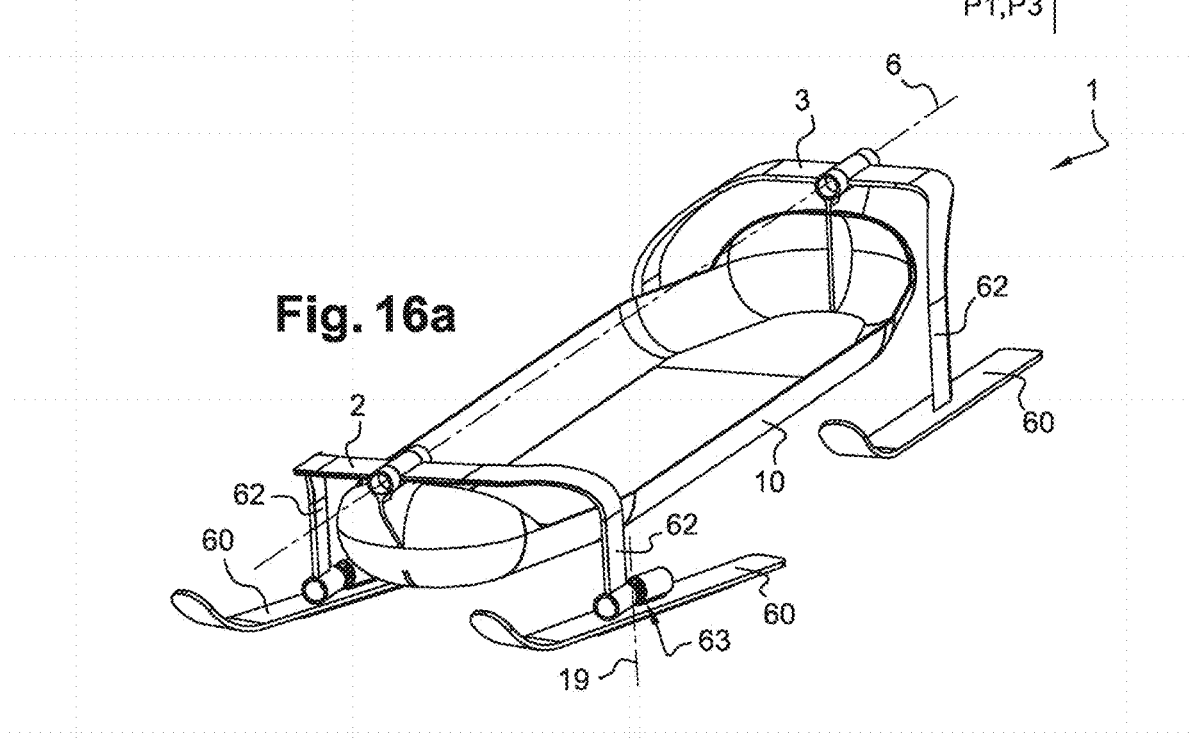

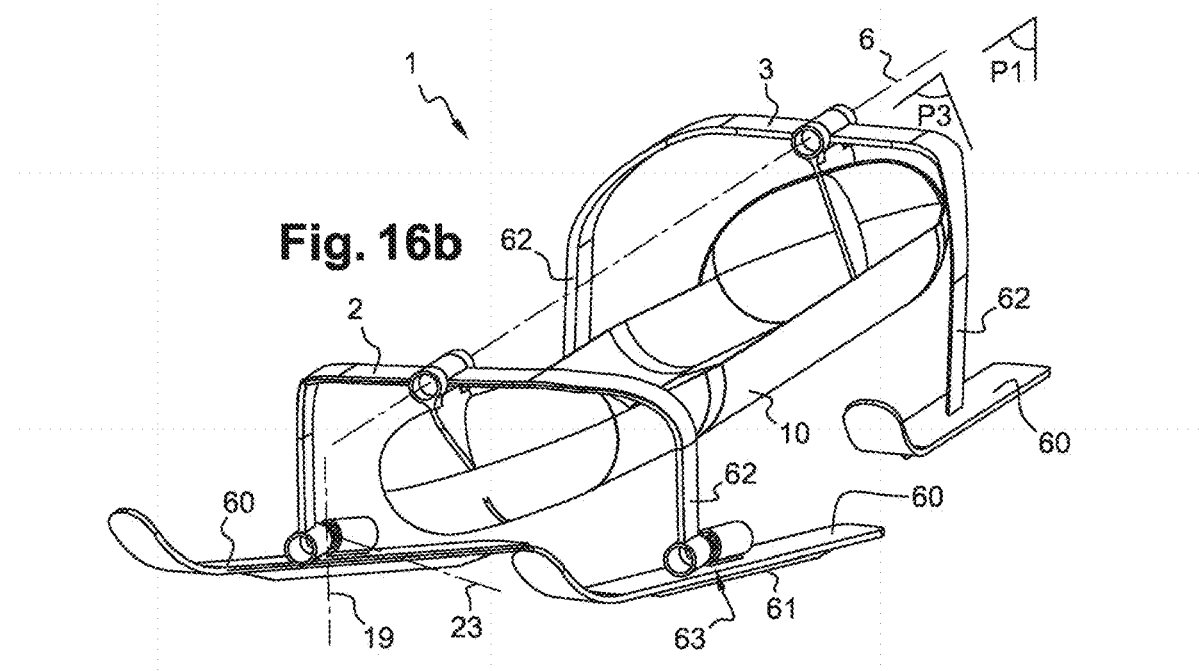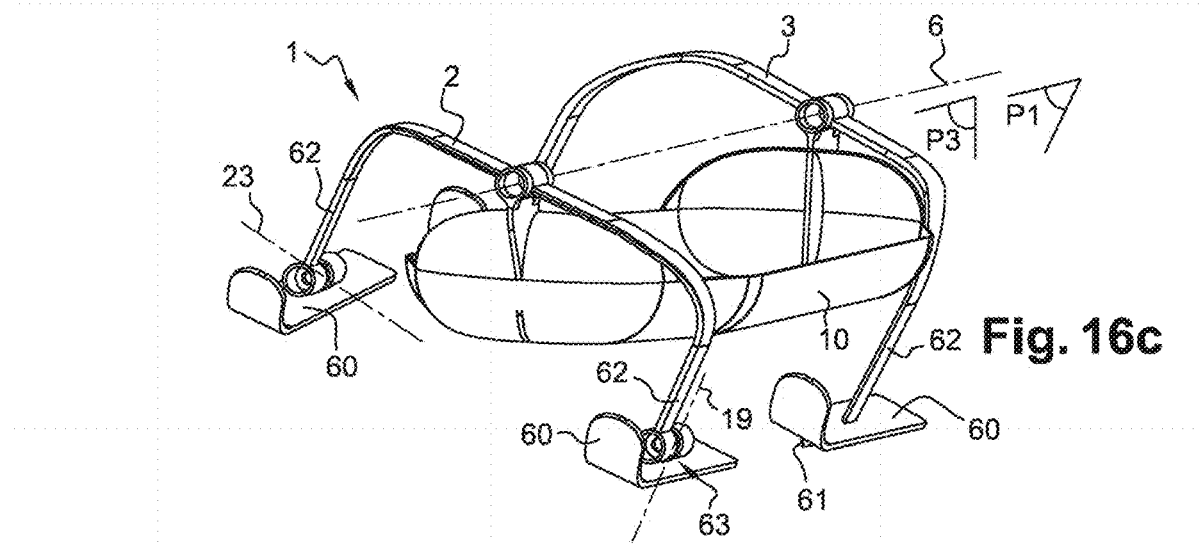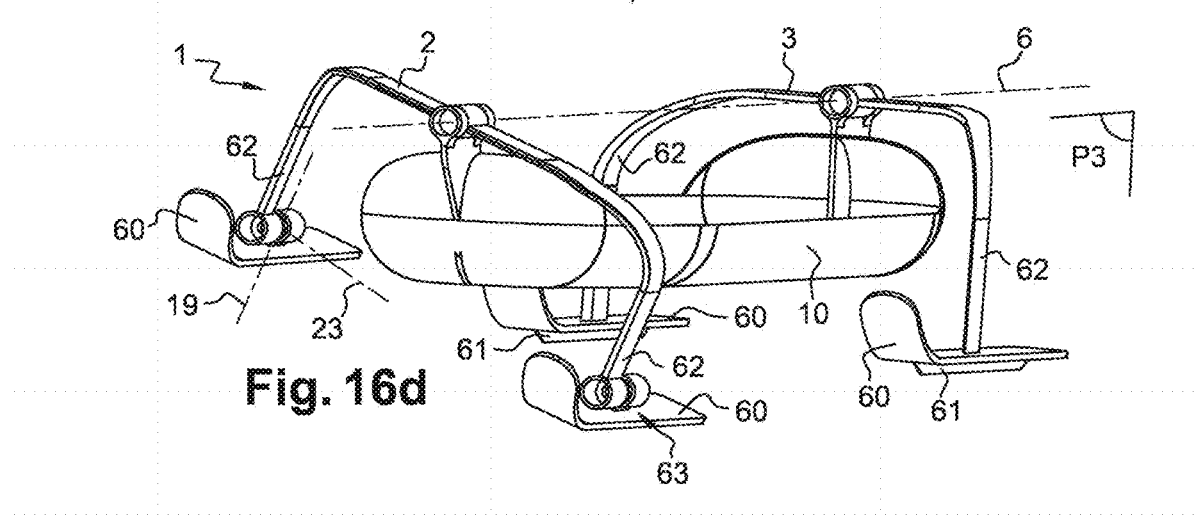

VEHICLE HAVING A CHASSIS AND A PENDULUM NACELLE

CROSS REFERENCE TO RELATED APPLICATIONS

The application is a National Phase Application of Patent Application PCT/FR2015/050799 filed on Mar. 27, 2015, which claims the benefit of and priority to French Patent Application 14/53513 filed on Apr. 17, 2014, the contents each of which are incorporated herein by reference in their entirety.

TECHNICAL FIELD

The present invention concerns a vehicle having a chassis and a pendulum nacelle.

BACKGROUND

The document WO 2006/129020 describes a vehicle of this type, which comprises a chassis on which are mounted a front wheel train and a rear wheel train, and a nacelle pivotally mounted relative to the chassis about a substantially median longitudinal hinge axis, so that the center of gravity of the nacelle is situated under said hinge axis.

In such a vehicle, when turning, the nacelle is inclined inwardly under the effect of the centrifugal force and in proportionally to it. Thus, the occupants feel no lateral acceleration—or the load undergoes no lateral stress—and the nacelle undergoes no torsional moment.

The benefits resulting therefrom are as follows:
improved comfort and sense of balance of the vehicle occupants, or increased stability of the transported loads in the nacelle;
gain in terms of dimensioning of the vehicle components relative to a conventional vehicle, to the extent that the stresses being experienced are less important, hence a relief and a reduced consumption;
due to the automatic inclination when turning, it is not necessary to resort to electronic or computer means allowing to analyze the data of the operating vehicle (accelerations, turn radius, etc.) and to act on the vehicle controls depending on these data, hence a gain in cost, in weight and in reliability.

Another vehicle of this type is described in the document US 2007/0267883.

However, this type of vehicle, if it is generally satisfactory, is still perfectible from the viewpoint of maneuverability.

BRIEF SUMMARY

The present invention aims to provide a vehicle having an improved maneuverability as compared to the prior art.

For this purpose, the invention concerns a vehicle comprising:
a chassis comprising a front cross-member and a rear cross-member;
at least one front train and one rear train mounted on the chassis, each train including at least two movement supports on the ground;
a nacelle intended to receive at least one person or a load, pivotally mounted relative to the chassis about a hinge axis which is substantially longitudinal, situated substantially in the median longitudinal plane of the vehicle, and arranged such that the center of gravity of the nacelle is situated below said hinge axis;
and wherein the front and rear cross-members are separate pieces, being linked together only by the nacelle, via the hinge axis, so that each cross-member is able to pivot about the hinge axis independently of one another.

According to a general definition of the invention, the front and rear cross-members are situated in the upper part of the nacelle. In addition, each of the front and rear cross-members presents:
a central part in which the hinge axis passes, and on which the front portion, respectively the rear portion, of the nacelle is pivotally mounted about the hinge axis;
and two end parts, each end part being connected to the corresponding movement support by a link system.

By panning to equip the vehicle with cross-members which are thus able to pivot independently of one another, the invention allows guaranteeing an excellent contact of each of the four movement supports with the ground, whatever the terrain. Indeed, a cross-member can pivot according to the stresses to which are subjected the movement supports linked thereto, in particular according to the profile of the terrain at each of these movement supports, without the stresses to which are subjected the movement supports linked to the other cross-member having any impact. The stability of the vehicle and its ability to move over rough terrains are therefore increased.

In particular, the vehicle according to the invention is well adapted to the canted or banked terrains, wherein it allows a plumb correction: indeed, the nacelle remains horizontal while the cross-members are parallel to the ground. As for the movement supports, if they have a possibility of inclination, their mid-plane—which is vertical in the neutral position—remains substantially vertical, and otherwise, this mid-plane remains substantially perpendicular to the ground. The vehicle according to the invention finds particular interest when the terrain presents opposite cant or slopes between the front and the rear of the vehicle, because each of the cross-members, being independent of one another in rotation about the hinge axis, can be placed parallel to the terrain part situated in the vicinity of the wheels that it carries.

Furthermore, concretely, as the cross-members are separate pieces that are not linked together (except via the nacelle and the hinge axis), in particular, there are no side-members linking the cross-members. The chassis therefore does not present the shape of a frame, but is constituted only of the two cross-members. The chassis is therefore lighter. Furthermore, the absence of side-members promotes the accessibility of the nacelle laterally, in particular for a handicapped person.

In practice, each of the cross-members can generally extend transversely when the vehicle is in neutral position. However, the cross-members are not necessarily rectilinear, and can have curved portions or rectilinear portions inclined relative to each other.

The neutral position is the one occupied by the vehicle when it is resting on a flat and horizontal surface and when it is stationary, with the movement supports oriented so that the vehicle can move along a straight line.

The fact of arranging the cross-members in the upper part of the nacelle, and not for example at the height of the hubs of the wheel constituting movement supports, has many advantages.

First, the ground clearance of the vehicle is considerably increased, which is particularly useful in an all-terrain application of the vehicle.

Further, the movement supports of the concerned train, even the entire front and/or rear concerned train, can rotate over greater amplitude without being hindered by the corresponding cross-member. This greater freedom of rotation results in a greater ability to maneuver the vehicle, which is all the more interesting as the terrain is rough.

Concretely, the movement supports can be wheels, skis, tracks, or other, the different movement supports of the vehicle being not necessarily all of the same nature.

According to a possible embodiment, the movement supports of at least one train are steered ones, the link system of each of these movement supports on the corresponding cross-member including a steering pivot having a steering axis and allowing the steering of said movement supports.

According to a possible embodiment, the link system between each of the steered movement supports of a train and the corresponding cross-member comprises a hinged arm a first end of which is linked to an end of said cross-member and forms with said end of said cross-member a steering pivot, and a second end of which is linked to said movement support.

Said cross-member and said steering pivot can be situated above said movement support.

Having a steering pivot at the end of the cross-member, and not close to the movement support or to its hub, and preferably located high up, has many advantages.

The assembly comprising the movement supports of the train and the two hinged arms can rotate about the steering pivot over a large amplitude. This enables to further improve the maneuverability, but also to allow access to the vehicle via a large lateral space, in particular for handicapped people.

In addition, it is possible to disassemble the vehicle at the steering pivot, particularly for its transportation. With the above configuration, the subassemblies of the vehicle obtained after disassembly have a reduced size and also a limited weight.

Further, the axis of the steering pivot is preferably situated in a transverse plane of the vehicle and inclined upwards, in the direction of the median longitudinal symmetry plane of the vehicle, this to have a steering return effect and thus to improve the stability of the vehicle. It results from this arrangement, and from the fact that the cross-member and the steering pivot are situated in the upper part of the vehicle, that the cross-member can be much narrower than the vehicle track width, that is to say, the transverse distance between the two movement supports of a same train. This constitutes an important advantage of reducing dimensions when disassembling the vehicle at the steering pivot. By way of indication, the width of the cross-member can be in the range of half the width of the vehicle.

It should be noted that, whatever the position of the steering pivot (in particular above the movement supports), the usual geometric parameters in automobile—such as pivot angle and caster angle—can be perfectly mastered. Thus, the angle of the axis of the steering pivot can be adjusted so that the extension of this axis passes through the contact point of the wheel with the ground or another location, depending on the desired self-stability and steering return effects.

The vehicle can for example include two trains of two movement supports, each of the four movement supports being a steered.

Conversely, the vehicle can include no steered movement support. For example, it could be a sled provided with supports which can slide on a snowy surface and hitched to a machine such as a snowmobile, the path of which he would follow.

The vehicle can further include a steering wheel mounted on the nacelle capable of causing the steering of the steered movement supports through transmission means.

According to a possible embodiment, each of the movement supports is a steered one, the steering wheel and the transmission means being arranged to cause the steering of the movement supports of a first train, the vehicle further comprising a transmitting mechanism linking the transmission means and control means of the steering of the movement supports of the second train.

The second train mechanism—typically the rear train—can be symmetrical with the first train mechanism—typically the front train—relative to a median transverse plane of the vehicle, concerning:
 the link system between the cross-member and the movement supports;
 some components of the control means and transmission means (with the exception of parts of the transmission means directly linked to the steering wheel).

According to a first embodiment, the movement supports are wheels, the vehicle being capable of travelling on a road or on a non snowy natural terrain. The movement supports can also be tracks.

According to a second embodiment, the movement supports are sliding supports able to slide over a snowy surface, such as portions of tube or skis-shaped elements. The vehicle further comprises an attachment member which projects downwards from the sliding supports, the attachment members being designed to be able to sink into the snow and prevent lateral skidding of the vehicle. The vehicle can be a sled intended to be towed by a machine or a person, or a non-towed vehicle in which a driver is installed.

According to one embodiment of the invention, the vehicle movement supports can, like the nacelle, incline automatically and proportionally to the centrifugal force to the inside of a turn.

Such a vehicle, when turning, is thus able to find, automatically and without recourse to electronics, a perfect dynamic balance, while maintaining a reassuring self-stability, in particular in case of loss of adhesion. Such a disposition also allows lightening the components of the chassis and of the movement supports trains, insofar as the resultant of the forces applied to these supports generates no torsional moment or lateral flexion. The result is a reduction of manufacturing costs and driving power savings.

For the mechanism to operate, it is necessary that the pendulum moment generated by the nacelle is not thwarted by a reverse moment resulting from the ground reaction on the movement supports.

If such reverse moment exists, due to the design of the link system, it has to be less important than pendulum moment generated by the nacelle. In addition, the inclination of the nacelle must be transmitted to the movement supports. Despite such a reverse moment, an inclination of the movement supports is then obtained according to inclination of the nacelle.

In the case where the movement supports are sliding supports, it can be envisaged that, for each of the sliding supports, the link system includes an inclination pivot having a substantially longitudinal inclination axis situated close to the contact surface between the sliding support and the ground, the vehicle further comprising a coupling device between the nacelle and each of the sliding supports, the coupling devices being arranged so that the pivoting of the nacelle causes the inclination of the sliding supports.

By arranging the inclination axis as close as possible to the contact surface with the ground, it is possible to reduce the reverse direction moment applied to the sliding supports.

Furthermore, whether the movement supports are wheels, tracks or sliding supports, it can be envisaged that, for each of the movement supports, the link system includes an inclination pivot having an inclination axis:

which extends in a plane substantially parallel to the median longitudinal plane of the vehicle by being inclined downwards by an angle ($\alpha$) comprised between 5 and 45°, relative to the longitudinal axis of the vehicle, when moving closer to the contact point (P) between the movement support and the ground;

whose point of intersection with the perpendicular to the ground passing through said contact point between the movement support and the ground is substantially coincident with said contact point or situated under said contact point;

the vehicle being designed, due to its geometry and/or the presence of mechanical means associating the nacelle and the movement supports:

for causing, when the vehicle is running on a turn, an inclination of each of the movement supports to the inside of the turn, under the effect of centrifugal force, the cross-members remaining substantially parallel to the ground;

and to correct the plumb, when the vehicle is travelling in a cant or banked terrain, the nacelle remaining horizontal and the mid-plane of movement supports which is substantially vertical in the neutral position remaining substantially vertical.

This arrangement of the inclination axis allows that the ground reaction does not have a moment, relative to the pivot inclination axis, which counteracts the pendulum movement. In other terms, the geometry of movement supports is not opposed to this inclination.

In the case of a ski or of a track, there is no single contact point of the movement support with the ground. By "contact point", it is meant the point substantially situated at the center of the contact zone between the movement support and the ground.

According to a first variant, the vehicle comprises a coupling device between the nacelle and each of the movement supports, the coupling devices being arranged so that the pivoting of the nacelle causes the inclination of the movement supports and vice versa.

If the point of intersection between the inclination pivot axis and the ground substantially coincides with the contact point between said wheel and the ground, the moment of the reaction of the ground relative to the inclination pivot axis is zero. Therefore, the movement supports can incline only if the inclination movement of the nacelle, about the hinge axis, is transmitted thereto, hence the necessity of the coupling devices in this configuration.

Conversely, if the point of intersection between the inclination pivot axis and the perpendicular to the ground passing through the contact point between the movement support and the ground is situated under said contact point, the reaction moment of the ground relative to the inclination pivot axis causes an automatic inclination of the movement supports under the effect of the centrifugal force. Thus, when turning:

on the one hand, the nacelle pivots about the hinge axis; and, on the other hand, the movement supports incline by pivoting about the inclination axes.

In that case, we can provide for coupling devices for the transmission of the inclination between the movement supports and the nacelle: the nacelle inclines with the pendulum effect but also because it is driven by the inclination of the movement supports resulting from the moment that the ground reaction has relative to the inclination pivot axis. Similarly, the movement supports incline themselves but also because they are driven by the inclination of the nacelle via the coupling devices.

These coupling devices are however not necessary since the above inclination movements of the nacelle and the movement supports are obtained independently of one another, automatically, under the action of the centrifugal force.

Alternatively, if the point of intersection between the inclination axis and the perpendicular to the ground passing through said contact point between the movement support and the ground was situated above said contact point, the movement supports would tend to incline to the outside of the turn. This would require that the pendulum moment generated by the nacelle is more important and that the inclination of the nacelle is transmitted to the movement supports by a coupling device.

Furthermore, in the case where the inclination pivot axis is inclined by an angle $\alpha$ relative to the longitudinal axis of the vehicle, and according to a possible embodiment, the means of transmission between the steering wheel and the steered movement supports, and the steering control means of the movement supports of the second train, when they are present, comprise:

a rotary piece mounted freely in rotation on the nacelle about the hinge axis of the nacelle, the rotary piece being driven in rotation by a steering column which is connected to the steering wheel and which has an axis offset relative to the hinge axis of the nacelle;

and, for each steered movement support, a steering connecting-rod having a first end connected to the rotary piece at a distance from the hinge axis and a second end connected to the link system between said movement support and the corresponding cross-member;

the steering connecting-rods of a same train being substantially symmetrically disposed relative to the median longitudinal plane of the vehicle when the vehicle is in neutral position;

the direction of rotation of the rotary piece, relative to the direction of rotation of the steering wheel, as well as the positioning of steering connecting-rods being provided so that the transmission means and the control means are capable of compensating substantially accurately the steering induced by the inclination of the movement supports, by creating a reverse steering of the induced steering.

More precisely, if the inclination pivot is situated inside the wheelbase, the rotary piece must rotate in the reverse direction of the steering wheel (for example by means of a mechanical system including a pinion driven by the steering wheel and meshing with a toothed ring constituting the rotary piece). In this case, the over-steering induced by the inclination of the inclination pivot is compensated by the under-steering induced by the pivoting of the nacelle, therefore of the rotary piece.

Conversely, if the inclination pivot is situated outside the wheelbase, the rotary piece must rotate in the same direction as the steering wheel (for example by means of a chain transmitting the rotation). In this case, the under-steering induced by the inclination of the inclination pivot is compensated by the over-steering induced by the pivoting of the nacelle, therefore of the rotary piece.

Provision can be made that, for at least one movement support, the transmission means between the steering wheel and said movement support, and the coupling device between the nacelle and said movement support, when present, are removably assembled to said movement support, so that they can be temporarily disconnected from said movement support to allow rotating said movement support about the steering axis with a sufficient amplitude to release the access to the nacelle laterally.

This "sufficient amplitude" is greater than the amplitude of possible movement during normal operation, when the transmission means and the coupling device are connected to said movement support. This disposition aims to facilitate access to the nacelle by a handicapped person. Thus, advantageously, the invention predicts that a disconnection of each of the movement supports situated on the same side of the vehicle is possible, to further improve access.

Further, the link system between at least one cross-member and each of the corresponding movement supports can comprise a suspension device having a substantially transverse axis of suspension, when the vehicle is in neutral position.

According to a possible embodiment, from the hinge axis of the nacelle in the direction of a movement support, the link system comprises, in this order, the steering pivot, the inclination pivot, and the suspension device. However, this arrangement is not restrictive.

At least one link system can comprise a universal joint forming the inclination and suspension axes or, alternatively, that the inclination and suspension axes of at least one link system are dissociated, that is to say, not joined into a same piece such as a universal joint.

Further, the vehicle can comprise at least one electric motor and a battery able to supply the electric motor.

According to a possible embodiment, the nacelle comprises a frame and a seat mounted on the frame, the frame including two lateral portions linked by a front portion and a rear portion, the front and rear portions extending upwards relative to the lateral portions, the hinge axis of the nacelle being disposed above the lateral portions. This disposition, in which the chassis consists of cross-members situated in the upper part of the nacelle, allows increasing the ground clearance of the vehicle, which is very beneficial in all-terrain.

BRIEF DESCRIPTION OF THE DRAWINGS

Several possible embodiments of the invention are now described, by way of non limiting examples, with reference to the attached figures:

FIGS. 1b, 1c, 1d, 1e and 1f are respectively rear perspective, another rear perspective, front, lateral and top views of the vehicle of FIG. 1a;

FIGS. 2a, 2b and 2c are respectively perspective, front and top views of the vehicle of FIG. 1a when it moves flat when turning, without centrifugal force;

FIGS. 8a, 8b, 8c, 8d, 8e, 8f and 8g are front and flat terrain views of the vehicle of FIG. 1a respectively in a straight line, when turning without centrifugal force, when turning with centrifugal force, in a straight line with inclination, in a straight line in a canted manner, canted when turning upstream and canted when turning downstream, for illustrating the mechanism allowing to compensate the steering induced by the inclination of the axis of the inclination pivots;

FIGS. 9a to 9d are partial schematic representations of the vehicle of FIG. 1a, showing various possible relative positions of the steering pivot, of the inclination pivot, and of the suspension device;

FIGS. 10a and 10b, 11a and 11b are detailed views of the vehicle of FIG. 1a illustrating several possible variants of the inclination pivot and of the suspension device;

FIG. 14 is a perspective view of a vehicle according to a third embodiment of the invention, the vehicle being in neutral position;

FIG. 15 is a detailed view of the vehicle of FIG. 14, showing the junction between a cross-member and a sliding support;

FIGS. 16a to 16d are perspective views of the vehicle of FIG. 14, respectively on a flat ground when turning without centrifugal force, on flat ground when turning with centrifugal force, canted in straight-line with the right front ski following an unevenness of the ground, in a straight line with a terrain which is canted at the front and flat at the rear.

DETAILED DESCRIPTION

Figure 1A:
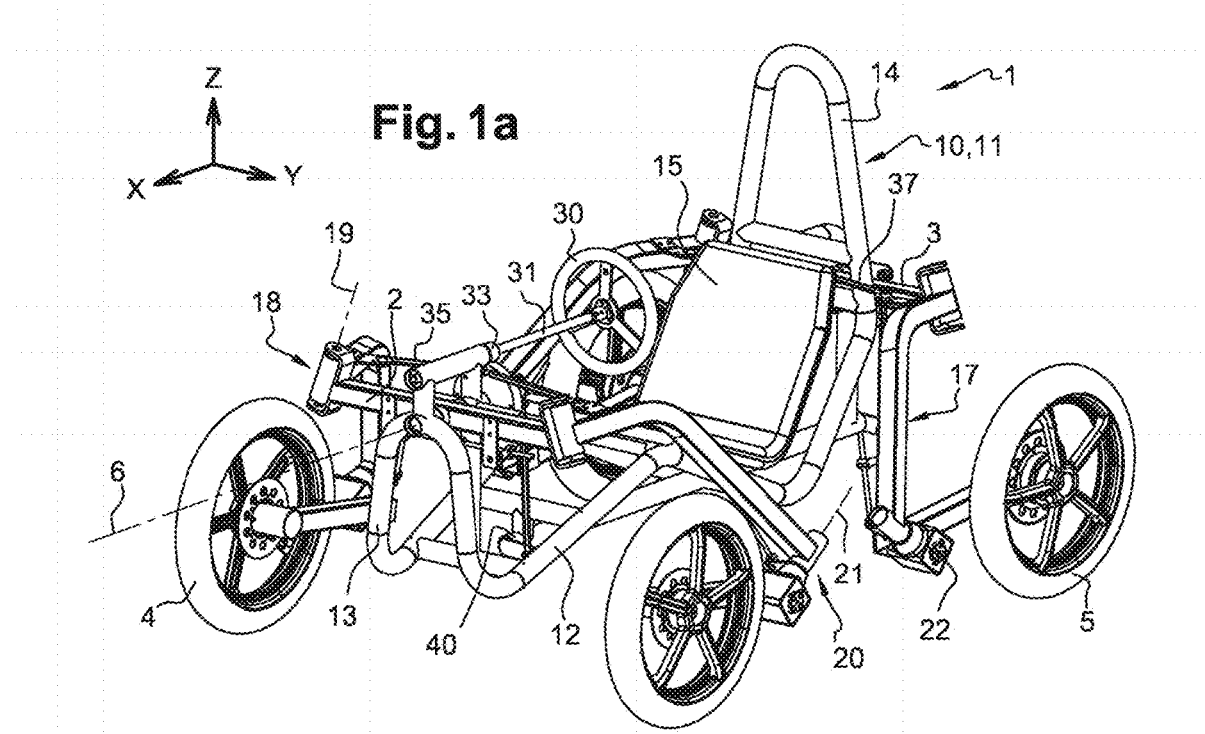
FIG. 1a is a perspective view of a vehicle according to a first embodiment of the invention, the vehicle being in neutral position.

FIG. 1a represents a first embodiment of a vehicle 1 which comprises:
 a chassis including a front cross-member 2 and a rear cross-member 3, formed for example of a metal tube, herein with a square section;
 two movement supports on the ground, herein in the form of wheels, assembled to each of the cross-members 2, 3, namely two front wheels 4 and two rear wheels 5;
 and a nacelle 10 intended to receive at least one person or a load, mounted on the chassis.

In FIG. 1a, the vehicle 1 is represented in neutral position, that is to say when it rests on a flat and horizontal surface and when it is stationary, the wheels 4, 5 being oriented so that the vehicle 1 can move along a straight line.

Initially, the vehicle 1 will be described with reference to this neutral position.

The longitudinal direction X is defined as the general longitudinal direction of the vehicle 1, which is therefore substantially horizontal in the neutral position. The terms "front" and "rear" will be used with reference to the direction X and to a movement of the vehicle 1 in forward motion. The transverse direction Y is defined as the direction orthogonal to X and which is substantially horizontal in neutral position. The terms "left", "right", "lateral" and "transverse" will be used with reference to the direction Y. The term "inside" is defined relative to a turn in which the vehicle 1 is engaged. Finally, the direction Z is defined as the direction orthogonal to X and Y, which is substantially vertical in the neutral position. The terms "height", "high" and "low" will be used with reference to the direction Z.

The vehicle 1 presents a median longitudinal plane of symmetry P1 parallel to (X, Z) and a median transverse plane P2, as seen in particular in FIG. 1f.

The nacelle 10 presents a median longitudinal plane P3 which, in neutral position of the vehicle, substantially coincides with the longitudinal median plane P1 of the vehicle 1.

The nacelle 10 comprises a frame 11 which is herein made from a metal tube and substantially symmetrical relative to the plane P1. The frame 11 includes two lateral portions 12 having the shape of a broken line having, from the front to the rear, an ascending front part 12a, a descending median part 12b, and an ascending rear part 12c (see FIG. 1e). The two lateral portions 12 are linked by a front portion 13 and a rear portion 14 which extend upwards relative to the lateral portions 12 for example by having the shape of an inverted V, the rear portion 14 being herein higher than the front portion 13.

The nacelle 10 also comprises a seat 15 mounted on the frame 11. In the illustrated embodiment in FIG. 1e, the cushion of the seat 15 is substantially coplanar with the median part of the lateral portions 12, whereas the back of the seat 15 is substantially coplanar with the rear part of the lateral portions 12. The legs of driver of the vehicle 1, when he installed in the seat 15, are substantially in a horizontal position and his back is inclined rearwards. Other embodiments may however be considered.

The nacelle 10 is pivotally mounted relative to the cross-members 2, 3 about a substantially longitudinal hinge axis 6 and situated substantially in the plane P1. In addition, the center of gravity of the nacelle 10 is situated under the hinge axis 6. Hence, the nacelle 10 can swing about the axis 6 like a pendulum, depending on the movements of the vehicle 1 and in particular on the slope on which it moves and on the centrifugal force to which it is subjected. The nacelle 10 can naturally and instantaneously find its balance whatever the gravity and centrifugal forces applied thereto.

More specifically, in the represented embodiment, the hinge axis 6 substantially passes through the center of each of the cross-members 2, 3, and substantially at the tip of the V of the front portion 13 of the nacelle 10. The hinge axis 6 of the nacelle 10 is thus disposed above the lateral portions 12 of the frame 11.

The cross-members 2, 3 are separate pieces and are interlinked only by the nacelle 10, via the hinge axis 6. Hence, the cross-members 2, 3 can pivot about the hinge axis 6 independently of one another.

in addition, each of the cross-members 2, 3 has two end parts, each end part being connected to a corresponding wheel 4, 5 by a link system.

The link system comprises a hinged arm 17, a first end of which is linked to an end portion of a cross-member 2, 3, and a second end of which is linked to the hub of the corresponding wheel 4, 5. The arm 17 can be formed of a succession of metal tubes—herein with a square section—interlinked with some degrees of freedom, as it will be now described.

In the represented embodiment, which is not restrictive, the arm 17 includes, from the cross-member 2, 3 in the direction of the wheel 4, 5, a first globally horizontal part 17a directed toward the plane P2 linked by a bent area to a second part 17b extending toward the plane P2 and downwards, then a third part 17c extending substantially horizontally toward the hub, away from the plane P2.

The link system between a cross-member 2, 3 and a steered wheel 4, 5 comprises a steering pivot 18 having a steering axis 19 and allowing the steering of said wheel 4, 5. The steering axis 19 is substantially situated in a plane (Y, Z) and is inclined upwards in the direction of the plane P1, by an angle β relative to the vertical (see FIG. 1d). The angle β is for example comprised between 10 and 30°. This configuration allows guaranteeing a good stability of the vehicle 1. In practice, the steering pivot 18 can be formed by a tube fixed at one end of a first part 17a of the arm 17 and hinged in a yoke secured to one end of a cross-member 2, 3.

In the embodiment of FIG. 1a, each of the four wheels 4, 5 is a steered one, the vehicle 1 thus including four steering pivots 18. This embodiment is however not restrictive. Thus, it can be envisaged that only the two front wheels 4 are steered ones.

The link system between a cross-member 2, 3 and each of the wheels 4, 5 additionally comprises an inclination pivot 20 having an inclination axis 21, so that, when the vehicle 1 is running on a turn, there occurs an inclination of each of the wheels 4, 5 to the inside of the turn, under the effect of the centrifugal force. In addition, the presence of the inclination pivot 20 allows the preservation of the plumb in a banked or canted terrain under the effect of the force of gravity.

The inclination axis 21 extends in a plane substantially parallel to P1, being inclined downwards at an angle α comprised between 5 and 45° relative to the horizontal, when we get closer to the contact point P between the wheel 4, 5 and the ground (see FIG. 1e). According to a possible embodiment, the inclination angle α of the inclination pivot axis is comprised between 20 and 40°, for example around 30°. In addition, the point of intersection A with the perpendicular to the ground passing through said contact point P between the wheel 4, 5 and the ground is here situated under said contact point P.

It follows that the wheels 4, 5 incline automatically in proportion to the centrifugal force to the inside of a turn. Indeed, with this configuration, not only the moment of reaction of the ground relative to the inclination pivot axis does not thwart this inclination movement, but in addition it causes it, under the effect of the centrifugal force.

In the represented embodiment, the inclination pivot 20 is situated inside the wheelbase that is to say behind the front wheels 4 and in front of the rear wheels 5. Thereby, the inclination axis 21 is inclined downwards from the rear to the front for the front wheels 4, and downwards from the front to the rear for the rear wheels 5.

In practice, the inclination pivot 20 can be formed by a sleeve fixed at an end of the second part 17b of the arm 17 pivotally engaged on a tube mounted at an end of the third part 17c of the arm 17.

So that the pivoting of the nacelle 10 about the hinge axis 6 causes the inclination of the wheels 4, 5 about the inclination axes 21 and vice versa, the vehicle 1 comprises a coupling device 25 between the nacelle 10 and each of the wheels 4, 5.

The coupling device 25 herein comprises flexible means of the type "push-pull" cables 26, associated, at their ends, to rigid rods 27 having one end equipped with a ball-joint.

Figure 1B:
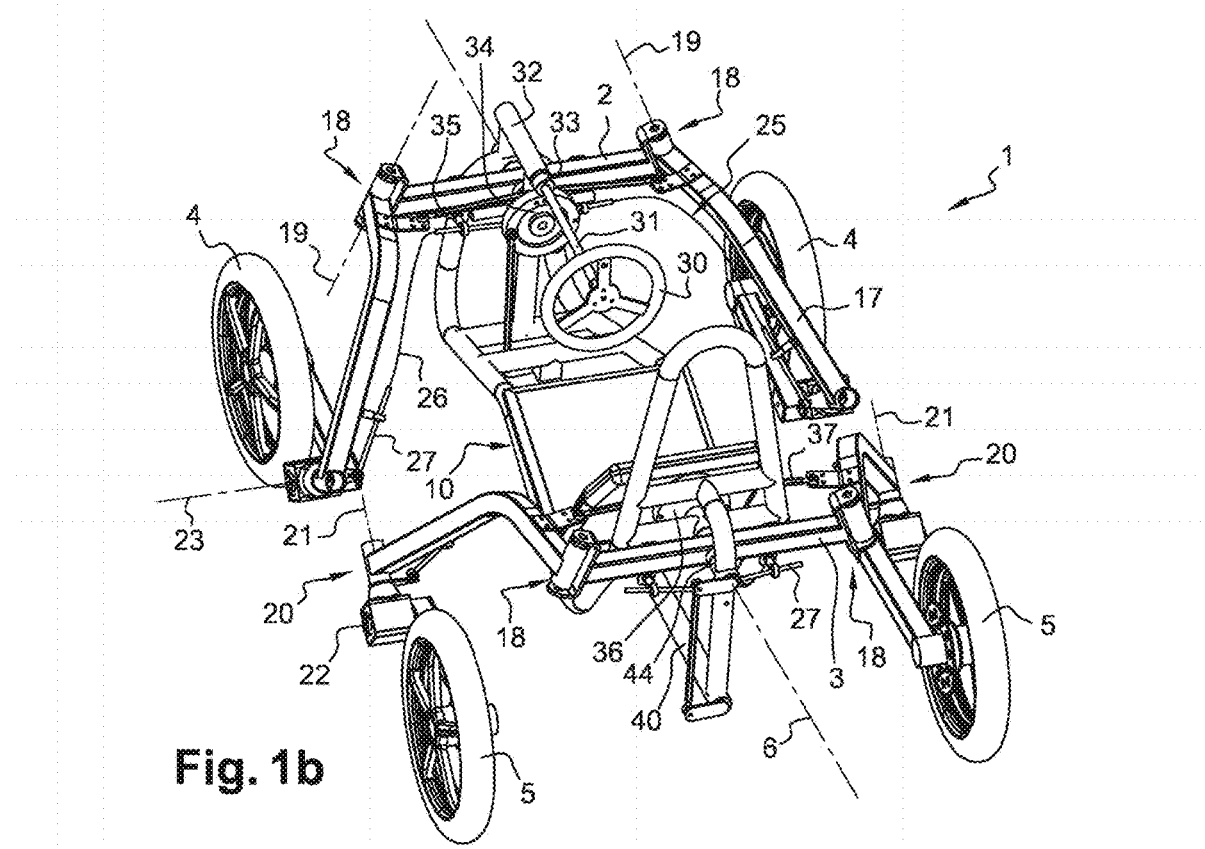

Thus, the ball-joint of a rod 27 is associated with an inclination pivot 20, For example by being fixed to a tab secured to the sleeve fixed at one end of the second part 17b of the arm 17. Further, the ball-joint of the other rod 27 is associated to the nacelle 10, in the plane P1 (see FIG. 1d). It should be noted that, to avoid overloading the drawings, the cables 26 have been presented only in FIG. 1b and—on one side only—in FIGS. 1d and 1f, the other figures showing only the rods 27.

Such a coupling device allows easily performing a transmission of linear movement between components which are remote, whatever their relative orientation.

Alternatively, we can predict that the coupling device 25 comprises hinged means with rigid components of the type ball-joints connecting-rods and rockers.

The link system between a cross-member 2, 3 and each of the wheels 4, 5 can additionally comprise a suspension device 22 having a substantially transverse axis of suspension 23, when the vehicle 1 is in neutral position. The presence of a suspension device 22 allows the wheels 4, 5 of the vehicle 1 to maintain contact with the terrain, in particular when it is uneven, thus improving road holding, safety, and comfort of the driver and of the potential passengers.

In the represented embodiment in FIG. 1a, the suspension device 22 is arranged between the third part 17c of the arm 17 and the inclination pivot 20. Other embodiments are however possible.

The vehicle 1 furthermore comprises a steering wheel 30 mounted on the nacelle 10. Thus, the driver acting on the wheel can cause the steering of wheels 4, 5 via transmission means.

In the represented embodiment, where the four wheels 4, 5 are steered ones, the steering of the front wheels 4 is obtained by the steering wheel 30 and the transmission means, and the steering of the rear wheels 5 is obtained via a transmitting mechanism linking the transmission means and control means of the steering of the rear wheels 5.

Further, since the inclination pivots 20 are not horizontal (in neutral position), the pivoting of the wheels 4, 5, in particular on a turn with centrifugal force, also leads to a steering of the wheels. However, this is not desirable because the driving feelings would be then modified relative to a conventional vehicle, insofar as the rotation angle of the steering wheel does not correspond to the effective steering angle of the wheels.

Thus, the vehicle 1 comprises a mechanism allowing to automatically correct this steering induced by the inclination of the wheels 4, 5 to the front, at the level of the transmission means between the steering wheel 30 and the front wheels 4, as well as to the rear, at the level of the control means of the steering of the rear wheels 5. Such a mechanism should preferably be present to the rear even if the rear wheels 5 were not steered one.

Thus, on the one hand, the transmission means comprise a steering column 31 whose rear end carries the steering wheel 30 and whose front end is mounted in rotation in a tube 32 of longitudinal axis secured to the frame 11 of the nacelle 10. On the steering column 31 is mounted a pinion 33 which meshes with a toothed wheel 34 mounted freely in rotation on the nacelle 10 about the hinge axis 6.

The toothed wheel 34 is thus driven in rotation by the steering column 31, in the opposite direction of the steering wheel 30. It allows both multiplying the rotational movement of the steering wheel 30 and correcting the induced steering, as explained below.

The transmission means also comprise, for each front wheel 4, a steering connecting-rod 35 presenting a first end connected to the toothed wheel 34 away from the hinge axis 6 and a second end connected to the link system between the wheel 4 and the cross-member 2. More specifically the second end of a steering connecting-rod 35 can be connected to a tab fixed to the first part 17a of the arm 17, close to the steering pivot 18. In the neutral position of the vehicle 1, the steering connecting-rods 35 are disposed symmetrically relative to the plane P1.

Figure 7:
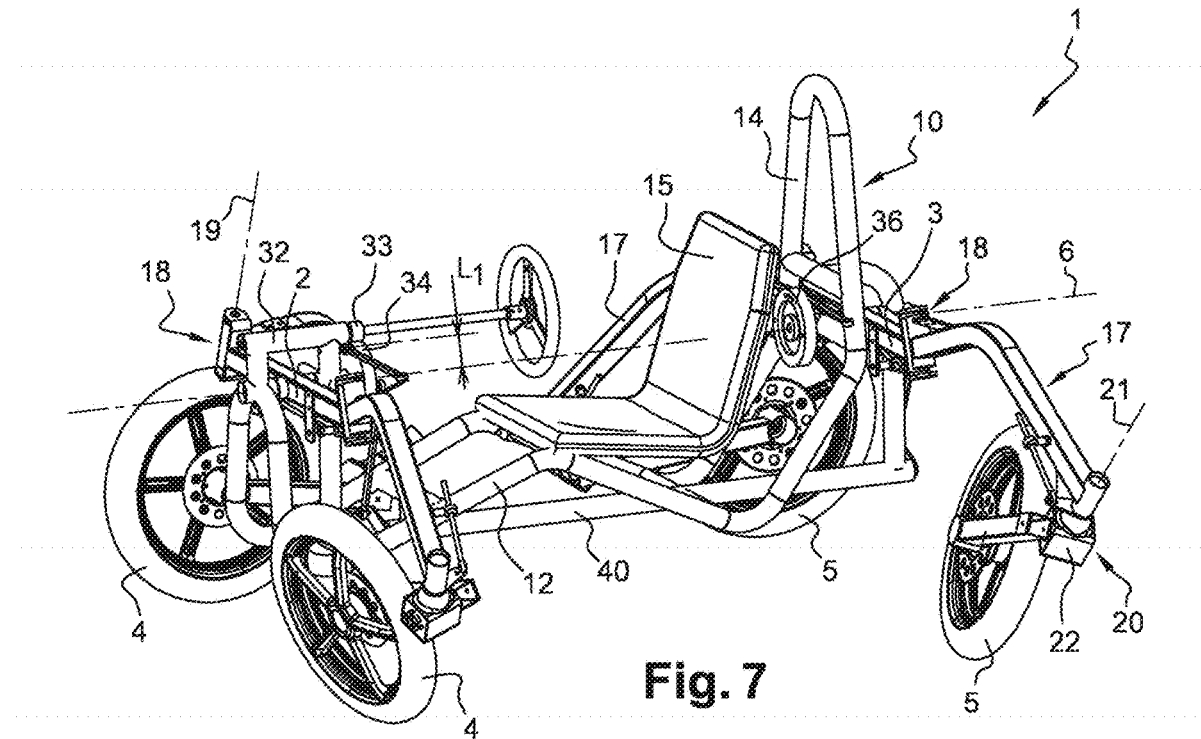
FIG. 7 is a perspective view of the vehicle of FIG. 1a in which the transmission means with the steering wheel and the coupling device with the nacelle have been disconnected from two lateral wheels.

In practice:
as illustrated in FIGS. 1d and 7, the axis of the toothed wheel 34—that is to say the hinge axis 6 of the nacelle 10—is offset relative to the first end of a steering connecting-rod 35 by a distance L1, which corresponds to the lever arm controlled by the inclination of the nacelle 10;

and, as illustrated in FIG. 1f, the second end of a steering connecting-rod 35 and the axis 19 of the corresponding steering pivot 18 are spaced by a distance L2 which corresponds to the lever arm controlling the steering of the concerned wheel 4.

On the other hand, the control means of steering of the rear wheels 5 comprise a disc 36 mounted freely in rotation on the nacelle 10 about the hinge axis 6. This disc 36 is driven in rotation by the steering column 31, in the opposite direction of the steering wheel 30, via the transmitting mechanism. Alternatively, the disc 36 could be replaced by a simple lever.

The control means of steering of the rear wheels 5 also comprise, for each rear wheel 5, a steering connecting-rod 37 having a first end connected to the disk 36 away from the hinge axis 6 and a second end connected to the link system between the wheel 5 and the cross-member 3. For example, the second end of a steering connecting-rod 37 can be connected to a tab fixed on the first part 17a of the arm 17, close to the steering pivot 18. In the neutral position of the vehicle 1, the steering connecting-rods 37 are disposed symmetrically relative to the plane P1. In practice, as illustrated in FIG. 1f, the second end of a steering connecting-rod 37 and the axis 19 of the corresponding inclination pivot 18 are spaced by a distance L2 which corresponds to the lever arm controlling the steering of the concerned wheel 4.

The connection between the ends of the connecting-rods 35, 37 and the corresponding component can be done by a ball-joint link. It should be noted that the geometry of the anchor points of the connecting-rods 35, 37 allows to comply with the conventional steering diagrams (diagrams called Ackermann or Jeantaud diagrams).

Figure 1C:
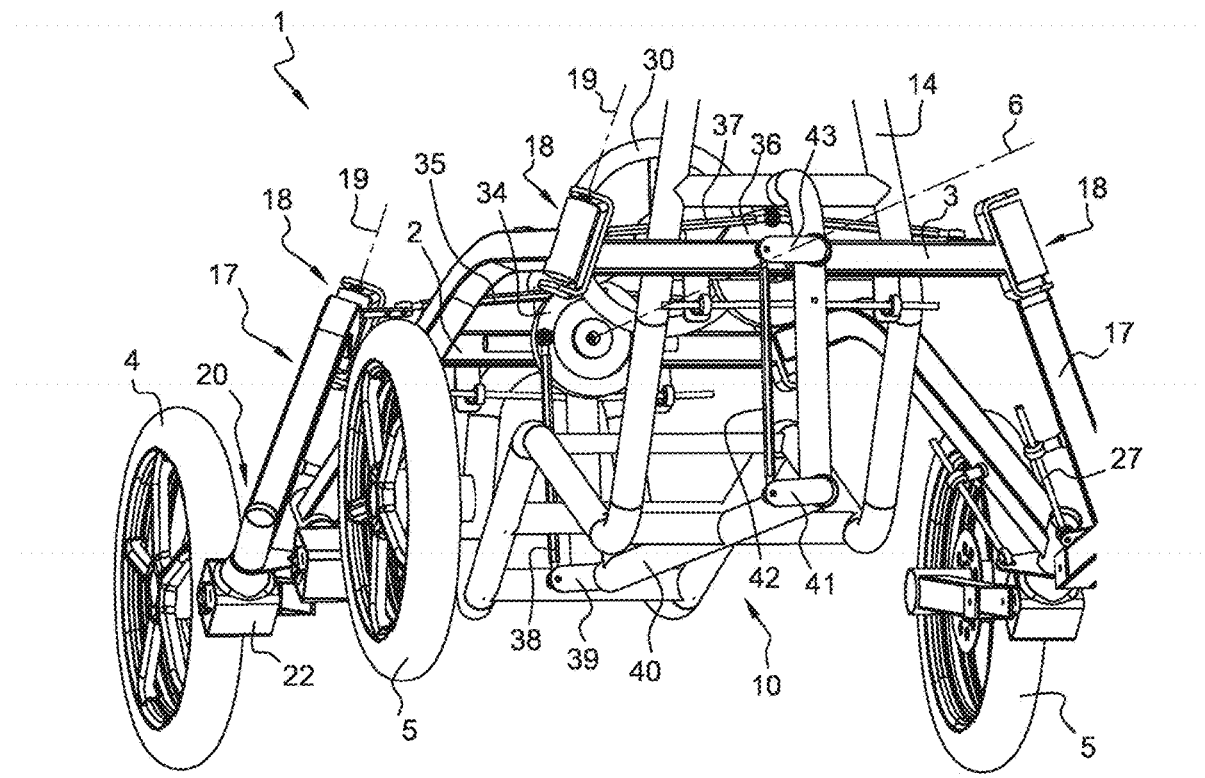

The return mechanism, illustrated in FIG. 1c, includes a transmission front connecting-rod 38 fixed at a first end to the toothed wheel 34 and at a second end on a front plate 39, at one end thereof. The other end of the front plate 39 is secured to the front end of a longitudinal shaft pivotally mounted in a longitudinal tube 40 secured to the nacelle 10 and which, herein, passes under the nacelle 10.

A first rear plate 41, secured to the rear end of the longitudinal shaft, is similarly associated to the lower end of a rear transmission connecting-rod 42. A second rear plate 43 is associated, on the one hand, to the upper end of the rear transmission connecting-rod 42 and, on the other hand, to one end of a shaft mounted in rotation in a longitudinal tube 44 secured to the nacelle 10 and whose axis coincides with the hinge axis 6. The other end of this shaft is fixed to the disc 36.

Thus, the disk 36 is driven in rotation by the steering wheel 30, similarly to the toothed wheel 34, in the opposite direction of the steering wheel 30, via the elements 31, 33, 34, 38, 39, 41, 42, 43. It allows both multiplying the rotational movement of the steering wheel 30 and correcting the induced steering.

The correction of the induced steering aims to ensure that only a relative movement of the steering wheel 30 relative to the nacelle 10 produce an effective steering of the wheels 4, 5. For this purpose, constraints are imposed, on the one hand, on the positioning of the steering connecting-rods 35, 37 and, on the other hand, on the rotation direction of the toothed wheel 34 and of the disc 36 relative to the rotation direction of the steering wheel 30.

For any rotation of the inclination pivot 20 and the wheels 4, 5, the ratio between the inclination component of the wheel and the component of the induced steering of the wheel is equal to cotan ($\alpha$).

Thus, for the steering induced by the inclination of the inclination axes 21 by an angle $\alpha$, to be compensated in a substantially exact way by the creation of a reverse steering, the distances L1 and L2 must satisfy the following relation: L2=cotan ($\alpha$)×L1. For example, for an angle $\alpha$=30°, we must have L2≈1.73 L1. For L1=75 mm, so we must have L2≈130 mm.

Furthermore, concretely, in the represented embodiment, where the inclination pivots 20 are situated inside the wheelbase, the toothed wheel 34 and the disc 36 should rotate in the opposite direction of the steering wheel 30.

In a non represented variant, where the inclination pivots 20 are situated outside the wheelbase, the toothed wheel 34 and the disc 36 should rotate in the same direction as the steering wheel 30. For example, the toothed wheel 34 could be associated with the steering column 31 via a chain.

The operation of the correction mechanism of the induced steering will be described in more detail below.

It should be noted that, in order not to overload the drawings, a given figure does not necessarily show all the previously described components of the vehicle 1.

In a straight line, as in FIGS. 1a to 1f, the self-stability of the vehicle 1 is ensured by the pendulum effect of the optionally weighted nacelle 10, and through the inclination of an angle $\beta$ of the steering pivots 18. The cross-members 2, 3 are substantially parallel to each other and to the ground.

The vehicle 1 moving flat when turning (left curve), without centrifugal force, is shown in FIGS. 2a, 2b and 2c.

In this case, the rotation of the steering wheel 30 causes the steering of the front wheels 4 through the transmission means, and the steering of the rear wheels 5 through the transmission means, the transmitting mechanism, and the rear steering control means. In the absence of centrifugal force, the nacelle 10 does not pivot and thus remains parallel to the ground, just as the cross-members 2, 3.

Figure 3B:
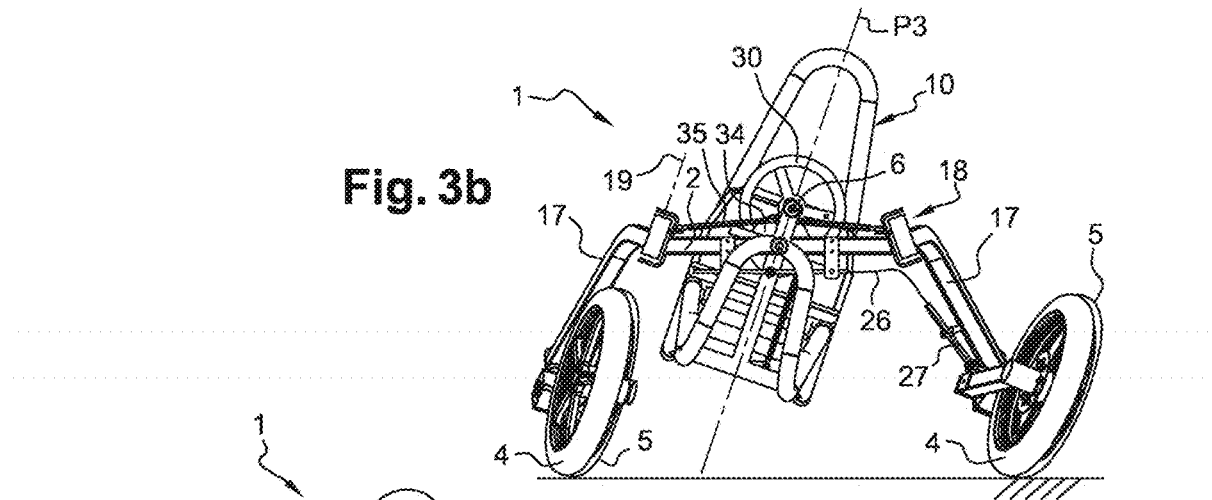
FIGS. 3a, 3b and 3c are respectively perspective front and top views of the vehicle of FIG. 1a when it moves flat when turning, with centrifugal force.
Figure 3A:
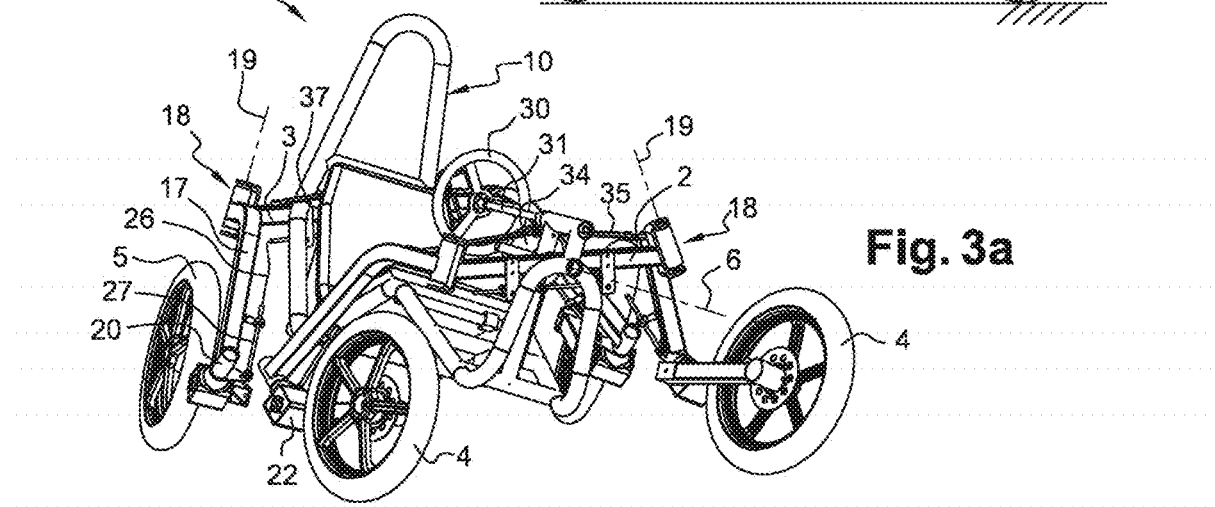
Figure 3C:
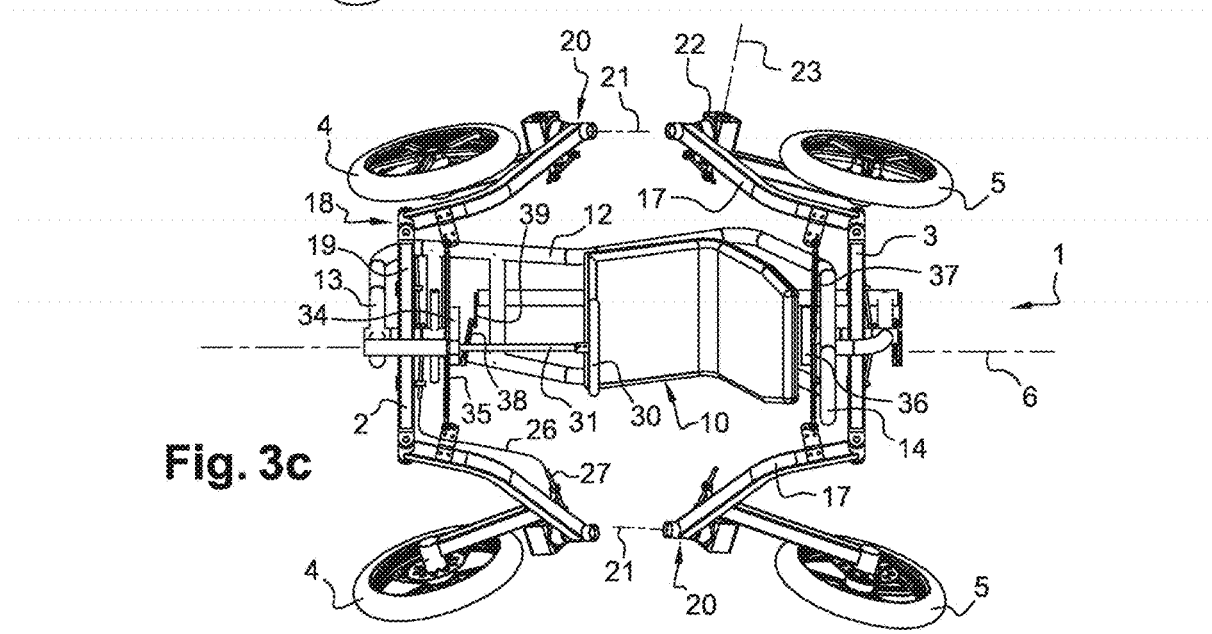

The vehicle 1 moving flat when turning (left curve), with centrifugal force, is shown in FIGS. 3a, 3b and 3c.

Due to the centrifugal force, function of the radius of the turn and the speed, the nacelle 10 pivots about the hinge axis 6 to the inside of the turn. This pivoting is obtained by pendulum effect, the center of gravity of the nacelle 10 being situated below the hinge axis 6. The median longitudinal plane P3 of the nacelle 10 is therefore no longer vertical. Further, under the effect of the centrifugal force, the four wheels 4, 5 are also inclined to the inside of the turn, substantially by the same angle as the nacelle 10, on the one hand, due to the arrangement of the axis 21 of the inclination pivot 20, as explained above and, on the other hand, through the coupling device 25 to the nacelle 10.

Thus, the nacelle 10 and the wheels 4, 5 are inclined by the same angle relative to the chassis and the ground, which is the angle of the resultant of the applied forces. In contrast, cross-members 2, 3 remain substantially parallel to each other and to the ground.

Figure 4A:
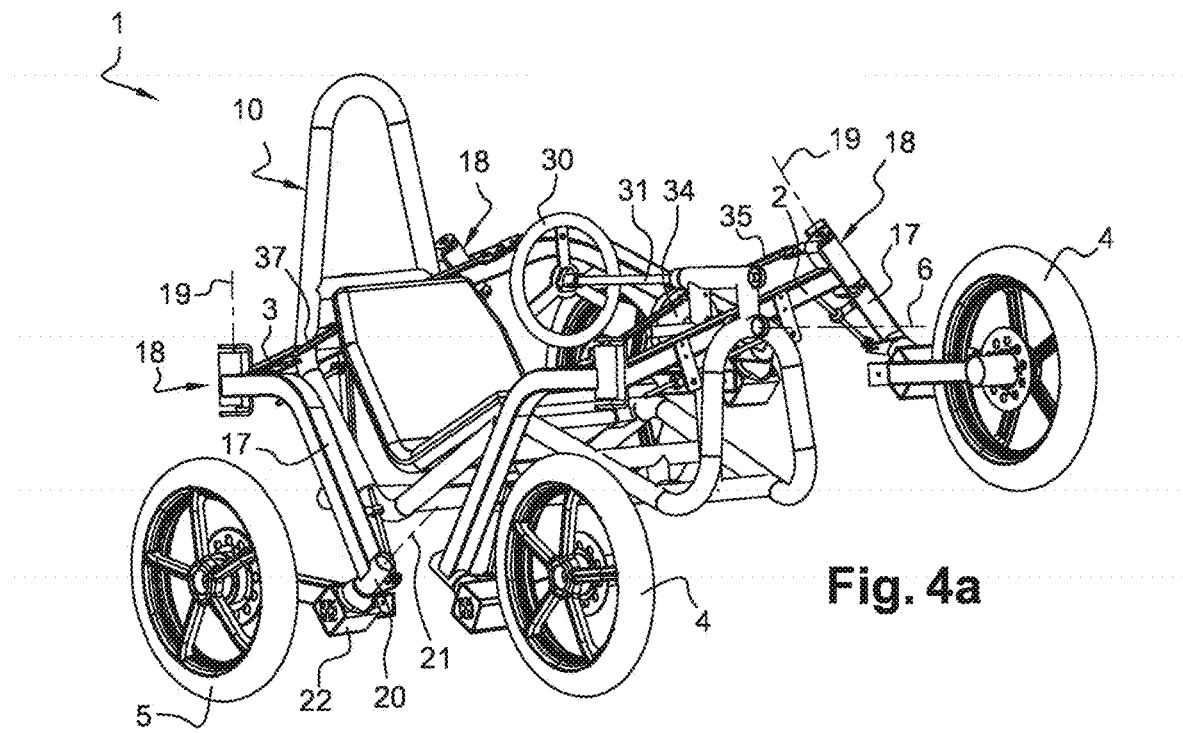
FIGS. 4a and 4b are respectively perspective and front views of the vehicle of FIG. 1a when it moves in a straight line in a canted manner.
Figure 4B:
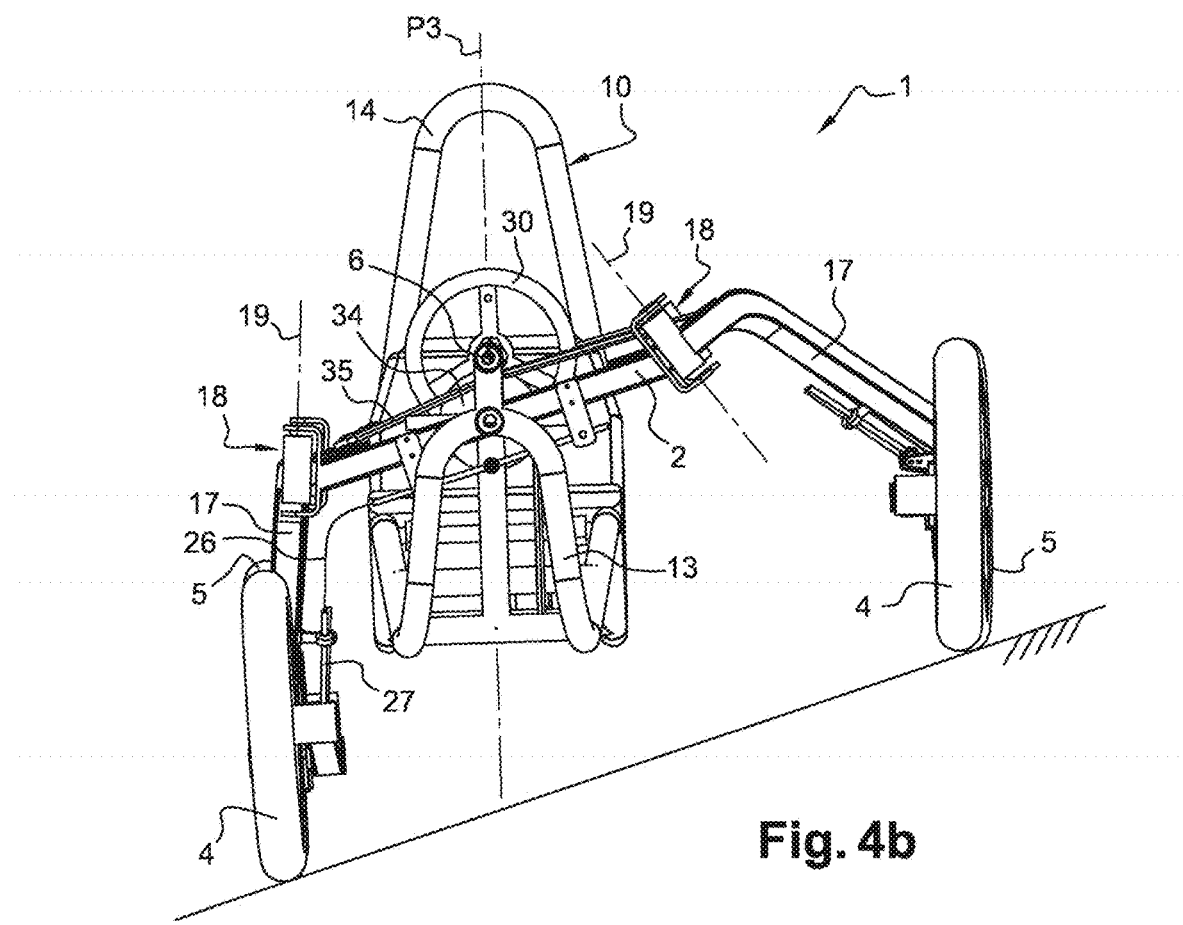

The vehicle 1 moving in a canted manner in a straight line is shown in FIGS. 4a and 4b.

The nacelle 10 pivotally mounted about the hinge axis 6 and having its center of gravity situated below said hinge axis 6, inclines with pendulum effect. The median longitudinal plane P3 of the nacelle 10 therefore remains substantially vertical. The wheels 4, 5 are inclined by the same angle relative to the chassis and the ground, which is the angle of the resultant of the applied forces. They are therefore substantially parallel to the plane P3. The cross-members 2, 3, for their part, are substantially parallel to each other and to the ground.

Figure 5A:
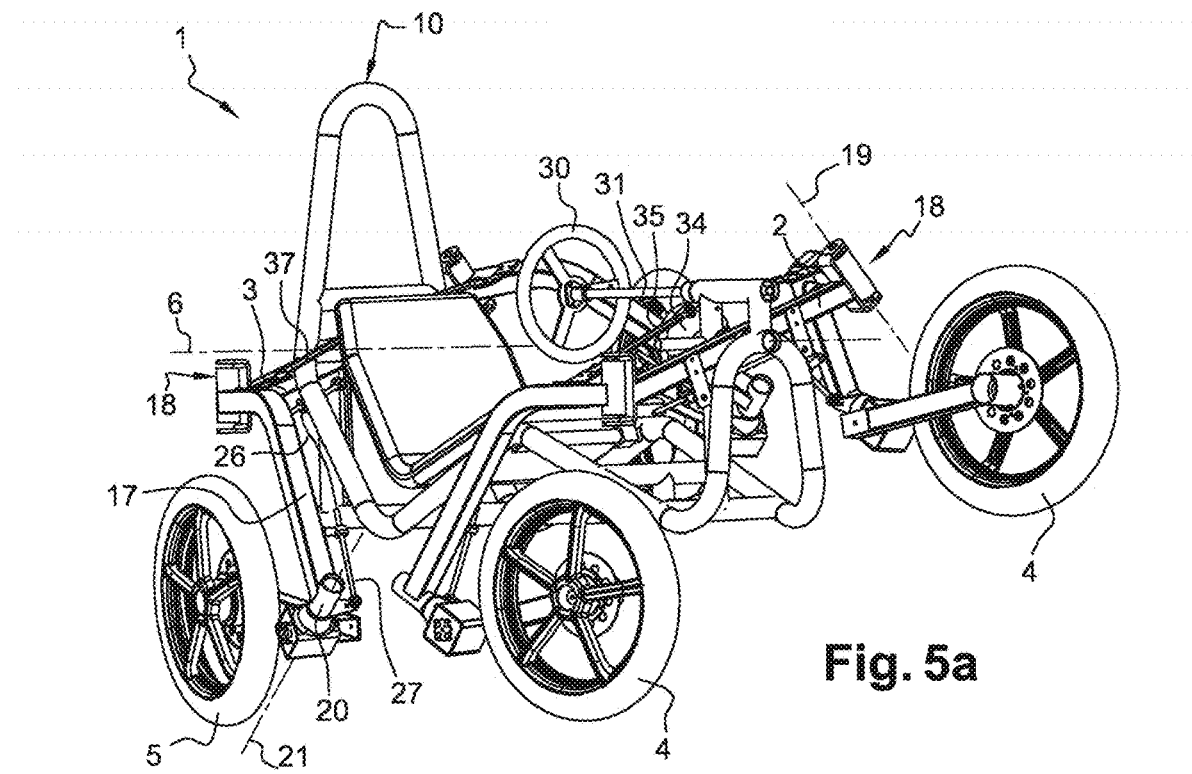
FIGS. 5a and 5b are respectively perspective and front views of the vehicle of FIG. 1a when it moves in a canted manner when turning.
Figure 5B:
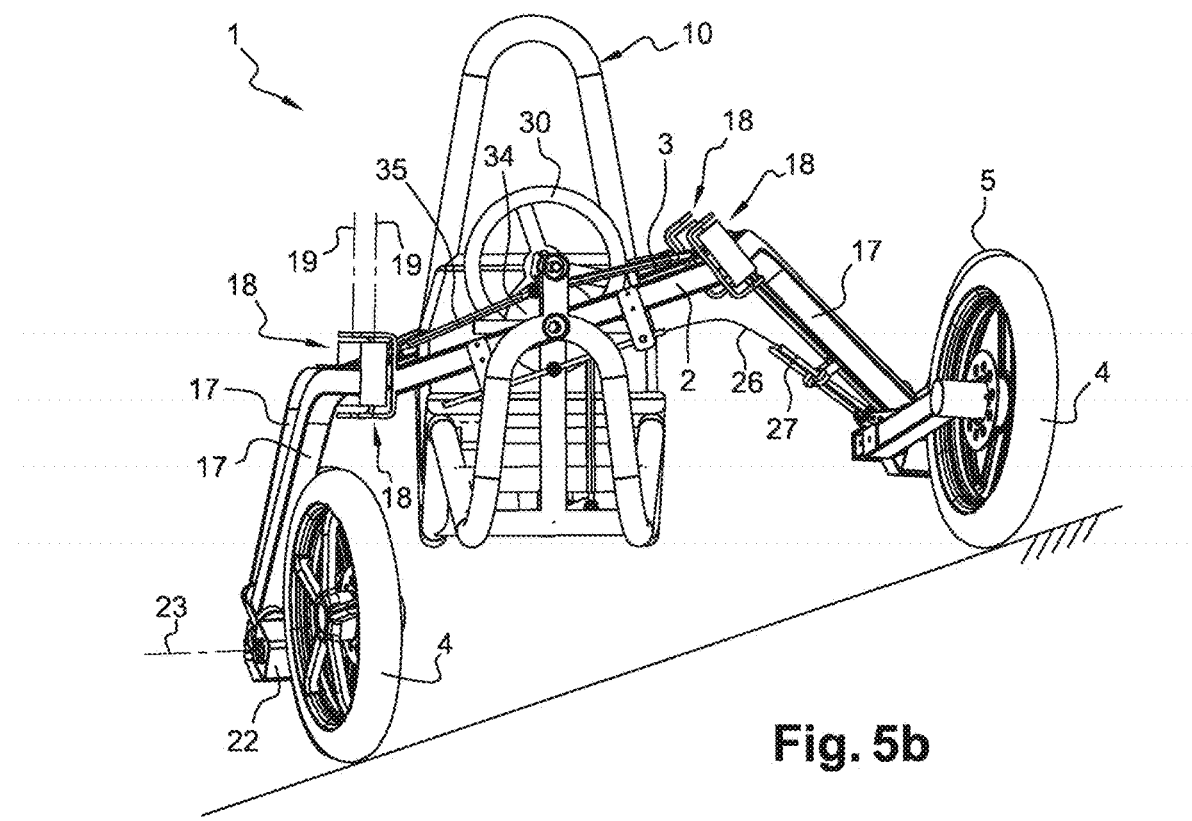

The vehicle 1 moving in a canted manner when turning is shown in FIGS. 5a and 5b.

Again, the median longitudinal plane P3 of the nacelle 10 is substantially vertical, and the wheels 4, 5 are substantially in a vertical plane, while being however steered (here, upstream). The cross-members 2, 3 remain substantially parallel to each other and to the ground.

Figure 6A:
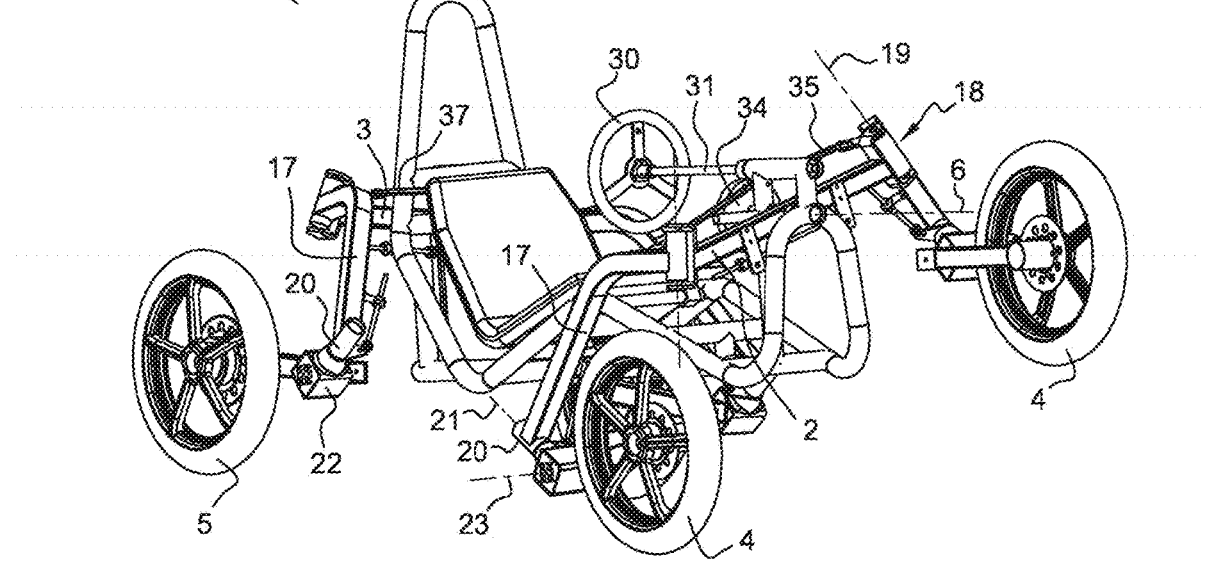
FIGS. 6a and 6b are respectively perspective and front views of the vehicle of FIG. 1a when it moves in a straight line, on an opposite canted terrain between the front and rear.
Figure 6B:
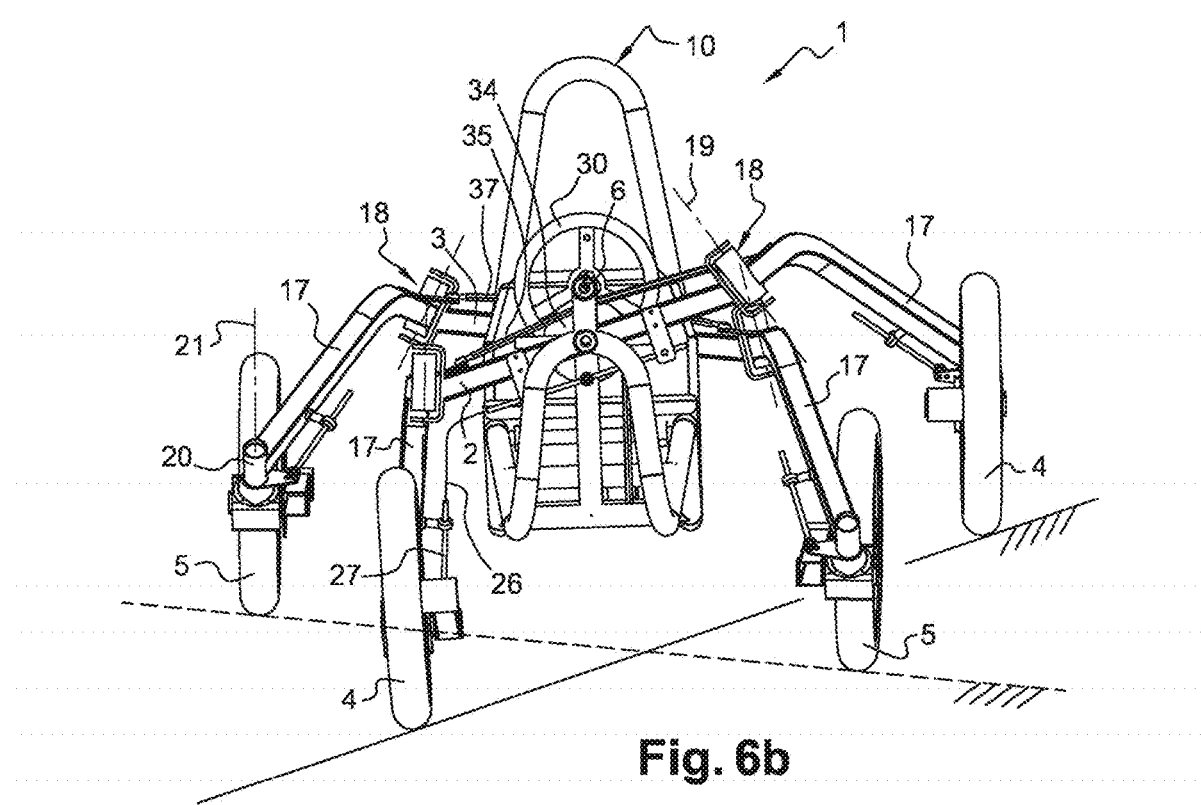

Finally, the vehicle 1 moving in a straight line, on a canted terrain which is opposite between the front and the rear, is shown in FIGS. 6a and 6b.

The median longitudinal plane P3 of the nacelle 10 remains substantially vertical, and the wheels 4, 5 are substantially parallel to the plane P3. Further, a given cross-member is substantially parallel to the ground at the level of the concerned wheels. Thereby in this case, with opposite cants, the front and rear cross-members 2, 3 are no longer parallel. This is made possible by their rotational independence about the hinge axis 6.

The vehicle 1 according to the invention is therefore particularly interesting in rough terrains, including important terrain unevenness (hollow, etc.) and/or variable cants. Indeed, the fact of having independent rotating cross-members allows the vehicle to move easily on this type of terrain, ensuring constant contact of each of the four wheels with the ground. The presence of suspensions further reinforces this good holding regardless of the terrain. In addition, the remaining vertical nacelle, safety and comfort of the driver, passengers and/or transported loads are also insured.

This capacity of the vehicle to compensate the cants in inclined terrains offers applications in steep terrain for commercial (agricultural, forested, military) or recreational (particularly in the mountain resorts) vehicles.

Another advantage linked to the fact that the cross-members 2, 3 are linked only via the hinge axis 6, and not via the side-members, is the accessibility of the vehicle 1 for a handicapped person.

For this purpose, it can be envisaged that, for the front wheel 4 and the rear wheel 5 situated on the same side of the vehicle 1, the steering connecting-rods 35, 37 and the coupling devices 25 may be assembled removably to these wheels. Thus, after having temporarily disconnected these wheels, one can pivot them about axes 19 beyond the authorized pivoting in the connected position. As illustrated in FIG. 7, this allows clearing the access to the nacelle 10 laterally, this access not being hindered by side-members.

Thus, a handicapped person can pass laterally from a wheelchair to the nacelle 10, and vice versa. A straightening up of the seat 15 and of the steering wheel 30 can be provided to further improve the ease of access. It should be noted that the pivoting of wheels releasing the access of the nacelle does not require any effort and can be easily performed by a handicapped person from his/her chair or from the seat 15.

We will now explain in more detail the correction mechanism of the induced steering, with reference to FIGS. 8a to 8g.

In FIG. 8a, the vehicle 1 is on a flat terrain and a straight line. The nacelle 10 and the wheels 4, 5 are plumb. The steering wheel 30 is straight relative to the nacelle 10 and the driver and relative to the ground. The toothed wheel 34 is straight relative to the nacelle 10 and the driver and relative to the ground, and does not provide any correction.

In FIG. 8b, the vehicle 1 is on flat terrain and in a right turn, without centrifugal force.

The nacelle 10 and the wheels 4, 5 are plumb. The steering wheel 30 is turned to the right. The toothed wheel 34, whose direction of rotation is opposite to that of the steering wheel, is turned to the left. The wheels 4, 5 are steered to the right due to the rotation of the toothed wheel 34, corresponding to the rotation of the steering wheel 30.

The wheels 4, 5 did not pivot about the axis 19 so there is no induced steering. As the nacelle 10 did not pivot, any correction of the steering angle has been provided. So, the actual steering of the wheels 4, 5 corresponds to the steering control that the driver has applied to the steering wheel 30.

In FIG. 8c, the vehicle 1 is on a flat terrain and in a left turn, with centrifugal force.

The nacelle 10 and the wheels 4, 5 are inclined along the balance planes of forces. The steering wheel 30 is turned to the left, the toothed wheel 34 is turned to the right relative to the nacelle 10, and the wheels 4, 5 are steered to the left.

The inclination of the wheels 4, 5 products an induced over-steering to the left, but the inclination of the nacelle 10 causes a rotation of the toothed wheel to the left relative to the ground plane and produces an induced counter-steering, without the position of the steering wheel 30 having changed relative to the driver and to the nacelle 10. Indeed, the action of the toothed wheel 34 on the steering connecting-rods 35 has been reduced by the inclination of the nacelle 10. Indeed, the action of the toothed wheel 34 on the steering connecting-rods 35 has been reduced by the inclination of the nacelle 10, which has compensated the steering induced by the inclination pivots 20.

The illustrated particular case, where the toothed wheel 34 is straight relative to the chassis, that is to say to the cross-members 2, 3, is the one where the steering angle corresponds to the one generated by the angle of inclination pivots 18 of the wheels 4, 5: the toothed wheel 34 did not act on the direction, the arms 17 have remained in a symmetrical position, but the steering wheel 30 is turned along the steering of the wheels 4, 5.

In FIG. 8d, the vehicle 1 is in a straight line, with inclination, this configuration occurring only in the case of violent lateral wind or occasionally in a turn end: the nacelle 10 and the wheels 4, 5 are inclined along to the balance planes of the forces, the wheel 30 is turned relative to the ground but is straight relative to the nacelle 10 and to the driver. The toothed wheel 34 is turned relative to the ground but not relative to the nacelle 10. The wheels 4, 5 are not steered. Thus, the rotation of the toothed wheel 34 relative to chassis has compensated the steering induced by the inclination of the inclination pivots 18 but the steering wheel 30 is not steered for the driver.

In FIG. 8e, the vehicle 1 is in a straight line in a canted terrain, it is very important that the variation of inclination of the wheels 4, 5 and the nacelle 10 relative to the ground does not modify the path chosen by the driver. In a straight line and in a canted terrain, the nacelle 10 and the wheels 4, 5 are plumb. The steering wheel 30 and the toothed wheel 34 are straight relative to the nacelle 10 and to the driver but turned relative to the chassis. The wheels 4, 5 are not steered. The steering induced by the angle relative to the horizontal of the inclination pivots 19 is compensated by the rotation relative to the chassis—that is to say relative to the cross-members 2, 3—and to the ground of the toothed wheel 34. Thus, for example, in an upstream cant to the right, the nacelle 10 remains horizontal and the wheels 4, 5 vertical while the cross-members 2, 3 are parallel to the ground. The relative inclination of the wheels 4, 5 relative to the ground and relative to their arms 17 generates an induced steering upstream but the relative inclination of the nacelle 10 causes a rotation of the toothed wheel 34 to the right relative to the plane of the ground therefore a counter-steering downstream. The steering wheel 30 and the toothed wheel 34 remain in an upright position: there is no path variation in a canted passageway and the vehicle is running along a straight line if the driver maintains the steering wheel 30 straight (relative to himself). Of course, an action on the steering wheel 30 allows the driver to orient himself as he pleases, to the right or to the left in a canted situation.

In FIG. 8f, the vehicle 1 is canted and makes a turn upstream: the nacelle 10 and the wheels 4, 5 are plumb, the steering wheel 30 is turned upstream relative to the nacelle 10 and to the driver, and the toothed wheel 34 is turned downstream relative to the nacelle 10. The wheels 4, 5 are steered upstream.

In FIG. 8g, the vehicle 1 is canted and makes a turn downstream: the nacelle 10 and the wheels 4, 5 are plumb, the steering wheel 30 is turned downstream relative to the nacelle 10 and to the driver, and the toothed wheel 34 is turned upstream relative to the nacelle 10. The wheels 4, 5 are steered downstream.

Thus, it is the inclination of the nacelle 10 that allows correcting the induced steering, via the toothed wheel 34. The rotation of the steering wheel 30 relative to the nacelle 10 on which it rotates is therefore the only cause of an effective steering. The known driving feelings in a car are then preserved (steering feeling relative to the nacelle 10 and not relative to the ground). In general, when there is no relative rotation of the steering wheel 30 and the nacelle 10, this results in straight wheels and a rectilinear path, regardless of the configuration.

The rotation of the disc 36 being the same as that of the toothed wheel 34, via the transmitting mechanism, a correction of the induced steering induced at the rear wheels 5 is also obtained.

As schematically illustrated in FIG. 9a, in the above-described link system, the different elements are positioned in this order, from the hinge axis 6 of the nacelle 10 in the direction of a wheel 4, 5: steering pivot 18, inclination pivot 20, then suspension device 22.

However, other arrangements are possible.

Thus, in FIG. 9b, the order is as follows: steering pivot 18, suspension device 22, then inclination pivot 20. In FIG. 9c, the order is as follows: inclination pivot 20, suspension device 22, then steering pivot 18. And in FIG. 9d, the order is as follows: suspension device 22, inclination pivot 20, and steering pivot 18.

In all cases, the inclination axis 21 passes under the contact point P of the wheel 4, 5 with the ground.

When the inclination axis 21 is disposed before the suspension axis 23, the distance from the inclination axis 21 to the contact point P of the wheel 4, 5 with the ground varies depending on the suspension travel 22, which has the effect of varying the pendulum moment applied to the wheel 4, 5 by the support reaction of the ground. The more the wheel 4, 5 is loaded, the more its pendulum moment is important, due to the increase of the lever arm, on the one hand, and to the increase of the ground reaction, on the other hand. In contrast, the angle of the inclination axis 21 does not vary relative to the ground, therefore the induced steering generated by the inclination of the wheel 4, 5 does not vary, which allows compensating it more easily.

This configuration can be advantageous for a road application which requires a specific steering diagram, but it can also be relevant to an all-terrain application because the pendulum lever will be more important on the most loaded wheels, which are also those that generate the greatest reaction of the ground.

Conversely, when the inclination axis 21 is disposed after the suspension axis 23, the distance from the inclination axis 21 at the contact point P of the wheel with the ground does not vary depending on the travel of the suspension device 22, and the pendulum moment applied to the wheel 4, 5, either. In contrast, the angle of the inclination axis 21 varies relative to the ground, therefore the induced steering generated by the inclination of the wheel 4, 5 varies, which makes it more difficult to compensate it rigorously.

This configuration can be advantageous for an all-terrain application when the suspension travel is important and the pendulum moment (in particular in canted terrain) outweighs the accuracy of the steering diagram.

Concretely, the axes 21 of the inclination pivot 20 and 23 of the suspension device 22 can be dissociated, as illustrated in FIGS. 10*a* and 10*b*.

In FIG. 10*a*, the suspension device 22 is composed of a suspension element with an elastomer having a transverse axis 23, and it is situated after the inclination pivot 20 (in the direction of the wheel).

In FIG. 10*b*, the suspension device 22 is composed of a suspension damper-spring assembly equipped with ball-joints at its ends to allow the inclination of the wheel 4, 5. The suspension device 22 is also situated after the inclination pivot 20 (in direction of the wheel).

Figure 11A:
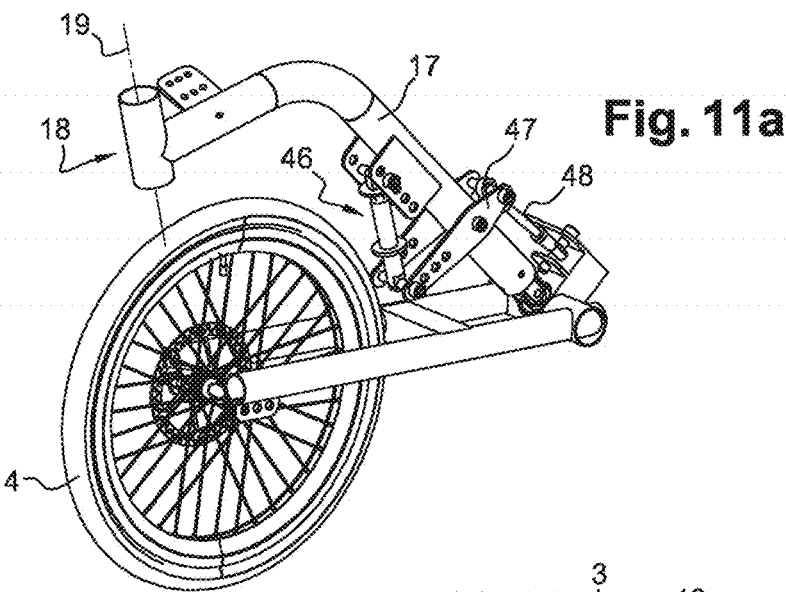

Alternatively, the inclination 21 and suspension 23 axes can be associated and secant, typically by means of a universal joint 45, as in FIGS. 11*a* and 11*b*, which is an enlarged detail view of FIG. 11*a*. The axis 45 of the universal joint situated in the longitudinal plane ensures the inclination function of the wheel 4, 5 and is inclined relative to the horizontal to pass below the contact point P of the wheel 4, 5 with the ground.

The universal joint 45 can be disposed, simply by rotating it by a quarter turn, according to a configuration where the inclination axis 21 is upstream or downstream of the suspension axis 23, according to the desired result.

In the disposition illustrated in FIGS. 11*a* and 11*b*, the inclination axis 21 is situated upstream of the suspension axis 23. An arm 17 is mounted on the universal joint 45, with a suspension damper-spring assembly 46 actuated by a rocker 47 and a tie-rod 48 equipped with ball-joints at its ends allowing the inclination of the wheel 4, 5. It should be noted that the axis on which is attached the lower ball-joint of the tie-rod is aligned with the inclination axis 21 of the universal joint 45, so that the applied forces do not disrupt the pendulum inclination freedom of the wheel 4, 5.

This disposition allows the suspension device 22 to automatically adapt to the load on the wheel: the inner (or upstream in a cant) wheel that is the least loaded has thus a suspension calibration more flexible than that of the outer (or downstream) wheel.

Figure 12A:
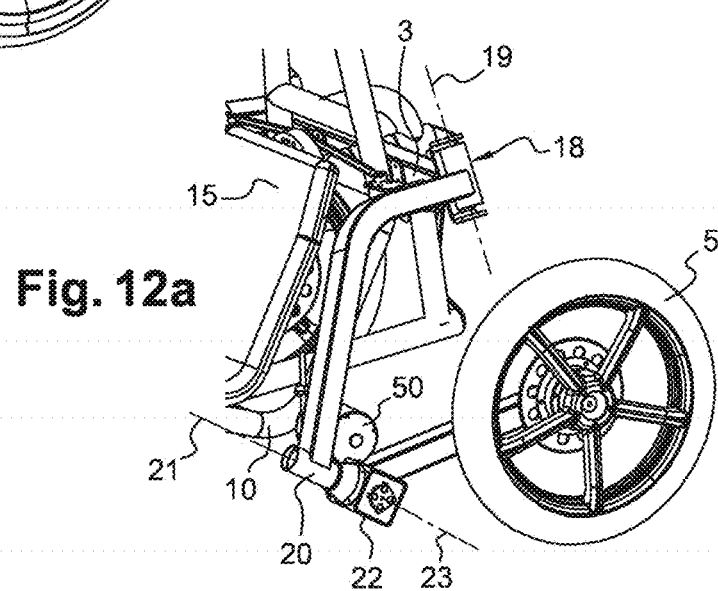
FIGS. 12a and 12b are detailed views of the vehicle of FIG. 1a equipped with a motor, according to several possible variants.
Figure 12B:
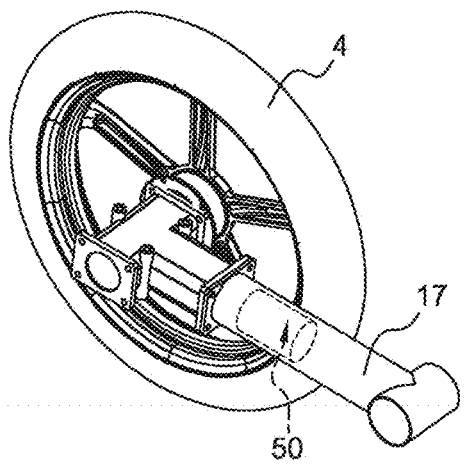

Further, as illustrated in FIGS. 12*a* and 12*b*, the vehicle 1 can be equipped with a motorization.

The integration of a motorization and its transmission raises two difficulties:
- the movement must be transmitted to a wheel hinged along three (steering, inclination and suspension) axes, which assumes that the transmission follows the corresponding movements;
- the weight of the motor and of the transmission counteracts the pendulum effect if it is applied above the inclination axis 21.

Preferably, the motorization is electric and the vehicle 1 additionally comprises a battery (not represented) for supplying the electric motor. A motor can be provided on each drive wheel.

According to a non represented first variant, the motor can be integrated in the hub, which eliminates any transmission problem since it follows the angular movements of the wheel. However, the motor then generates a counter-pendulum moment equal to at least the product of its weight by the radius of the wheel. To solve this problem, it is necessary to increase the pendulum effect factors, in particular by passing the inclination axis 21 of wheel significantly below the contact point P between the wheel and the ground.

According to a second variant, illustrated in FIG. 12*a*, the motor 50 is disposed transversely and transmits its movement by a chain or a belt (not represented). It is disposed as close as possible from the inclination axis 21 of the wheel 4, 5 to reduce the counter-pendulum moment.

According to a third variant, illustrated in FIG. 12*b*, the motor is integrated in the arm 17. The motor 50 is disposed longitudinally inside the arm 17 with a coaxial gear reducer and an angle transmission. The integration is very satisfactory and the counter-pendulum moment is reduced relative to the case of the motor-wheel.

Figure 13A:
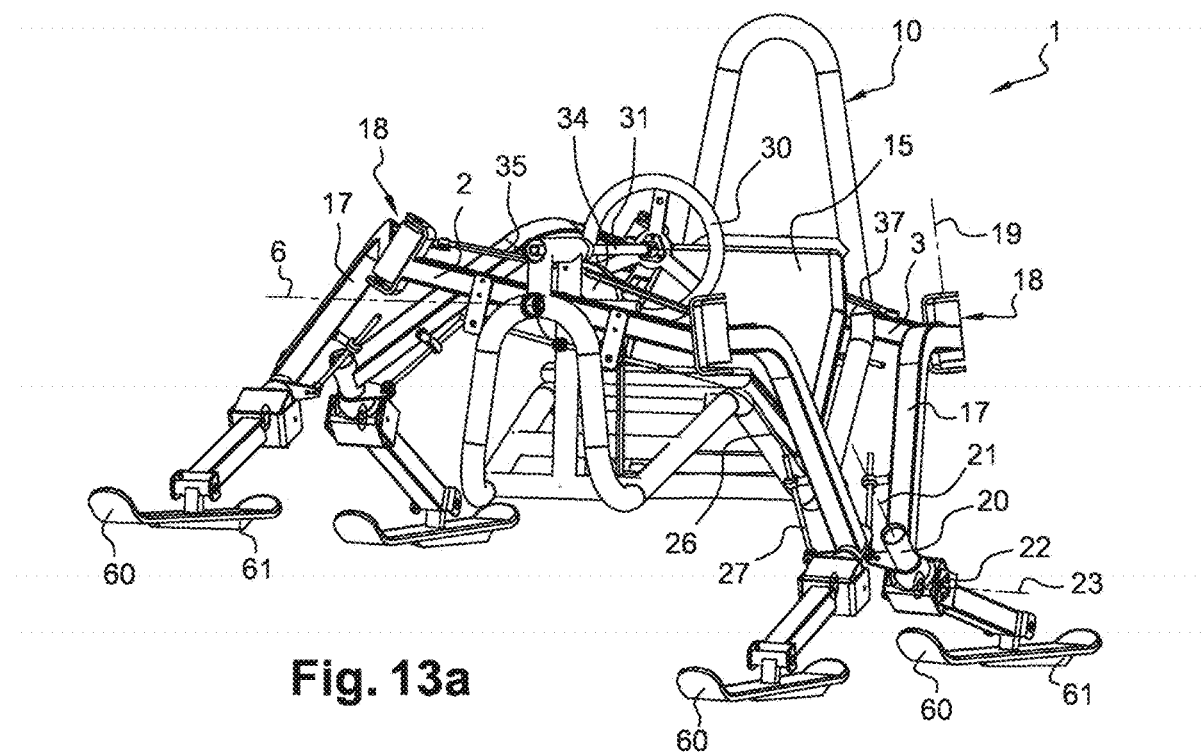
FIGS. 13a and 13b are perspective views of a vehicle according to a second embodiment of the invention, the vehicle being respectively canted in straight line and flat on a turn with centrifugal force.
Figure 13B:
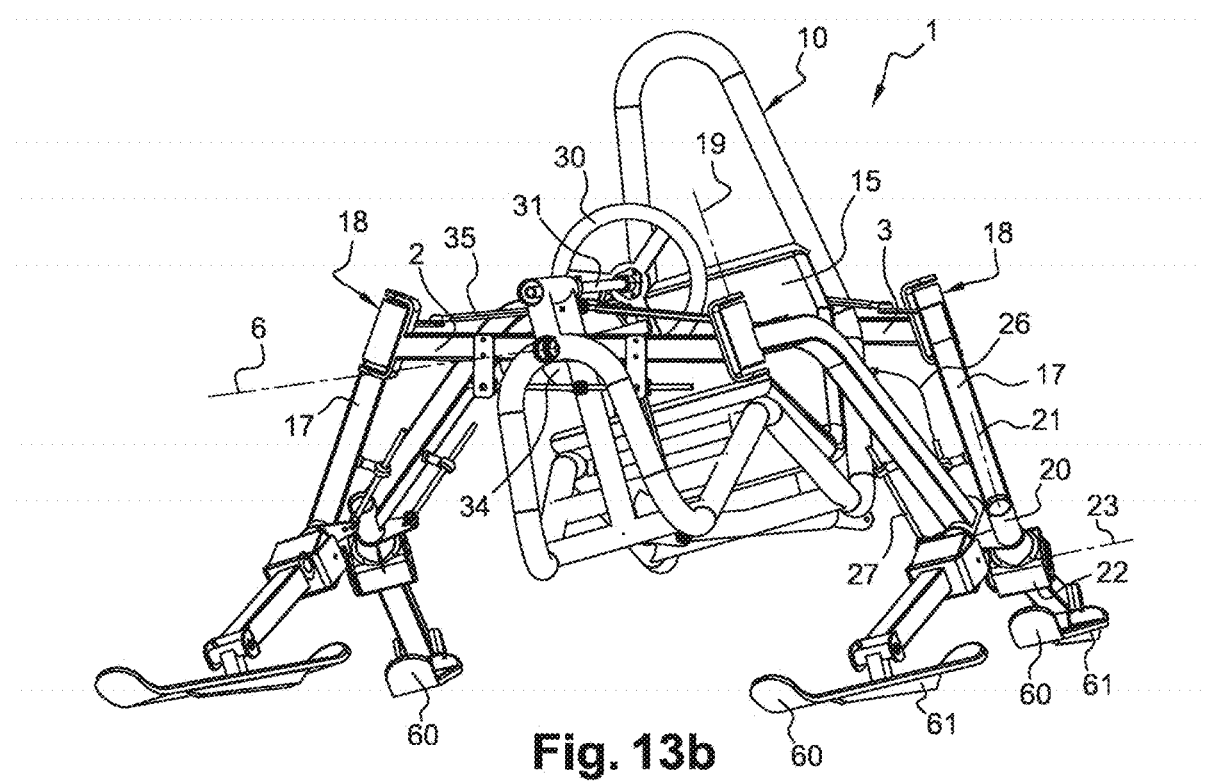

FIGS. 13*a* and 13*b* illustrate a vehicle 1 according to a second embodiment of the invention.

This vehicle 1 differs from that previously described essentially by the fact that the movement supports are not wheels anymore but supports capable of sliding on a snowy surface, herein skis 60, that is to say, substantially flat elements that can have a front part raised as a shovel. Further, the vehicle 1 comprises, preferably, under each of the skis 60, an attachment member 61 which protrudes from skis 60 downwards, and which is designed to be able to sink into the snow and prevent lateral skidding of the vehicle 1.

The behavior of the vehicle 1 on the different types of terrain is identical to what has been previously described.

Particularly, when canted (FIG. 13*a*), the nacelle 10 inclines by pendulum effect about the hinge axis 6, its median longitudinal plane P3 thus remaining substantially vertical. The skis 60 incline by the same angle relative to the chassis and to the ground, their median longitudinal plane being thus parallel to the plane P3 and not perpendicular to the ground. The cross-members 2, 3, for their part, are substantially parallel to each other and to the ground.

Furthermore, when turning with centrifugal force (FIG. 13*b*), the nacelle 10 pivots about the hinge axis 6 to the inside of the turn, its median longitudinal plane P3 being no longer vertical. Further, under the effect of centrifugal force, the four skis are also inclined to the inside of the turn, substantially by the same angle as the nacelle 10, on the one hand, due to the arrangement of the axis 21 of the inclination pivot 20—passing under the contact point between the skis 60 and the ground—and, on the other hand, via the coupling device 25 to the nacelle 10. In contrast, the cross-members 2, 3 remain substantially parallel to each other and to the ground.

Referring now to FIGS. 14 to 16*d*, which illustrate a vehicle according to a third embodiment of the invention.

The vehicle 1 is in this case a sled intended to be towed by a machine or a person and to move on a snowy surface. It does not include motorization.

Thus, movement supports are not wheels but skis 60 capable of moving on the snow and equipped with attachment members 61 which can sink into the snow and prevent lateral skidding of the vehicle 1.

The characteristics of the vehicle according to the third embodiment that differ from the first embodiment are set out below.

The nacelle 10 is intended to receive children, an injured person in a lying position, or a load. It consists for example of a shell made of synthetic material. The nacelle 10 can be removably assembled to the cross-members 2, 3, so as to be airlifted or used as a stretcher, independently of the chassis.

In the represented embodiment, only the two front skis 60 are steered ones, the rear skis 60 being fixed to the rear cross-member 3 without the possibility of relative movement. However, a version with four steered skis or, on the contrary, no steered ski, can also be considered.

The cross-members 2, 3 are extended at their lateral ends by substantially vertical arms 62—in neutral position of the vehicle 1—secured to the corresponding cross-members. A cross-member 2, 3 and its arms 62 thus form a U-shaped rigid assembly.

As seen in FIG. 15, the link system between the front cross-member 2 and each of the steered skis 60 includes a universal joint 63 which is situated at the lower end of the arm 62 and which forms:

a substantially vertical steering axis 19, to allow the steering of the skis 60;

and a substantially transverse suspension axis 23, allowing the ski 60 to conform the relief.

Alternatively, the axes 19, 23 could be dissociated and not grouped through a universal joint.

In the represented embodiment, the link system between the front cross-member 2 and each of the steered skis 60 does not include an inclination pivot, this not being restrictive.

Since no inclination pivot is provided, the vehicle 1 is devoid of coupling devices and correction mechanism of the induced steering.

The fact of providing for steered skis aims to confer the vehicle 1 a greater maneuverability. But the path of this vehicle is not intended to be controlled by an occupant of the nacelle 10. Consequently, this vehicle is devoid of steering wheel, transmission means, transmitting mechanism and control means of the possible rear steering.

In FIG. 16*a*, the vehicle 1 moves on flat ground, in a right turn, without centrifugal force. In this case, the steered skis 60 are steered to the right, having pivoted about the steering axis 19. In the absence of centrifugal force, the nacelle 10 does not pivot and thus remains parallel to the ground, just as the cross-members 2, 3.

In FIG. 16*b*, the vehicle 1 moves on flat ground in a right turn, with centrifugal force. Due to the centrifugal force, depending on the radius of the turn and the speed, the nacelle 10 pivots about the hinge axis 6 to the inside of the turn. This pivoting is obtained by pendulum effect, the center of gravity of the nacelle 10 being situated below the hinge axis 6. The median longitudinal plane P3 of the nacelle 10 is therefore no longer vertical. In contrast, the cross-members 2, 3 remain substantially parallel to each other and to the ground, as well as the skis 60.

In FIG. 16*c*, the vehicle 1 moves in a canted manner in a straight line. The nacelle 10, pivotally mounted about the hinge axis 6 and having its center of gravity situated below the said hinge axis 6, inclines with pendulum effect. The median longitudinal plane P3 of the nacelle 10 remains substantially vertical. The cross-members 2, 3, for their part are substantially parallel to each other and to the ground, as well as the skis 60. We note that the right front ski has pivoted, relative to the neutral position, about the suspension axis 23, to conform a terrain locally including an unevenness.

In FIG. 16*d*, the vehicle 1 moves in a straight line with a terrain which is canted at the front and flat at the rear.

The median longitudinal plane P3 of the nacelle 10 remains substantially vertical. The skis 60 remain substantially parallel to the ground, that is to say, they are inclined relative to the horizontal at the front, due to the presence of a cant, but they are horizontal to the rear, where the terrain is flat. Similarly, a given cross-members 2, 3 is substantially parallel to the ground at the level of the concerned skis 60: thus, the front and rear cross-members 2, 3 are no longer parallel to each other, which is made possible by their independence in rotation about the hinge axis 6.

Thus, the invention brings a decisive improvement to the prior art, by providing a vehicle, for example a land vehicle with four wheels or a sled, whose nacelle is inclinable—as well as, in some embodiments, the movement supports. As a result, the vehicle:

can be perfectly and automatically balanced when turning without recourse to electronic assistances;

presents an increased comfort and safety;

can be simplified and lightened because it is not necessary to oversize it relative to the needs «in a straight line» where the solicitations are exerted only in the vertical plane;

presents a significantly decreased consumption.

In the case where, additionally, the movement supports are inclinable, the vehicle allows a permanent contact of the movement supports with the ground regardless of the importance of the cants and the opposition of these cants between the front and the rear of the vehicle ("bridge crossing"), but also when turning with strong centrifugal force. This architecture allows a new ability to adapt to all situations on the road and in steep terrain.

It goes without saying that the invention is not limited to the embodiments described above as examples but comprises all the described technical equivalents and variants of the means as well as their combinations.

Thus, a road vehicle of the first or second embodiment type could be considered, but whose wheels or skis are devoid of inclination pivots. In this case, the wheels would remain in a plane perpendicular to the ground, or the skis would remain parallel to the ground, while the nacelle would pivot.

A vehicle of the third embodiment type could also be considered, where the skis include an inclination axis. This axis may be inclined by an angle α, as described. Alternatively, this axis could be substantially longitudinal, in which case, preferably, this axis would be situated close to the contact surface between the ski and the ground, to limit movement against pendulum. Additionally, there should be a coupling device between the nacelle and each of the skis, so that the pivoting of the nacelle drives the inclination of the skis.

The invention claimed is:
1. A vehicle comprising:
a chassis comprising a front cross-member and a rear cross-member;
at least one front train and one rear train mounted on the chassis, each train including at least two movement supports on the ground;
a nacelle intended to receive at least one person or a load, pivotally mounted relative to the chassis about a hinge axis which is substantially longitudinal, substantially situated in the median longitudinal plane (P1) of the vehicle, and arranged so that the center of gravity of the nacelle is situated under said hinge axis;
wherein the front and rear cross-members are distinct pieces being linked together only by the nacelle, via the hinge axis, so as to be able to pivot about the hinge axis independently of one another;
characterized in that the front and rear cross-members are situated in the upper part of the nacelle and in that each of the front and rear cross-members presents:
a central part wherein passes the hinge axis, and on which the front portion, respectively the rear portion, of the nacelle is pivotally mounted about the hinge axis;
and two end parts, each end part being connected to the corresponding movement support by a link system having at least one steering axis independent of the hinge axis.
2. The vehicle according to claim 1, characterized in that the movement supports of at least one train are steered ones, the link system of each of these movement supports on the corresponding cross-member including a steering pivot having the at least one steering axis and allowing the steering of said movement supports.
3. The vehicle according to claim 2, characterized in that the link system between each of the steered movement supports of a train and the corresponding cross-member comprises a hinged arm whose first end is linked at an end of said cross-member and forms, with said end of said cross-member, a steering pivot and a second end of which is linked to said movement support.
4. The vehicle according to claim 3, characterized in that said cross-member and said steering pivot are situated above said movement support.
5. The vehicle according to claim 2, characterized in that it comprises a steering wheel mounted on the nacelle, capable of causing the steering of the steered movement supports through transmission means.
6. The vehicle according to claim 5, characterized in that each of the movement supports is a steered one, the steering wheel and the transmission means being arranged to cause the steering of the movement supports of a first train, the vehicle further comprising a transmitting mechanism linking the transmission means and the steering control means of the movement supports of the second train.
7. The vehicle according to claim 1, characterized in that the movement supports are wheels or tracks.
8. The vehicle according to claim 1, characterized in that the movement supports are sliding supports capable of sliding on a snowy surface, and in that the vehicle further comprises an attachment member which projects from the sliding supports downwards, the attachment members being designed to be able to sink into the snow and prevent lateral skidding of the vehicle.

9. The vehicle according to claim 8, characterized in that, for each of the sliding supports, the link system includes an inclination pivot having a substantially longitudinal inclination axis situated close to the contact surface between the sliding support and the ground, and in that the vehicle comprises a coupling device between the nacelle and each of the sliding supports, the coupling devices being arranged so that the pivoting of the nacelle causes the inclination of the sliding supports.

10. The vehicle according to claim 1, characterized in that, for each of the movement supports, the link system includes an inclination pivot having an inclination axis:
which extends in a plane substantially parallel to the median longitudinal plane (P1) of the vehicle by being inclined downwards at an angle ($\alpha$) between 5 and 45°, relative to the longitudinal axis of vehicle, when it approaches the contact point (P) between the movement support and the ground;
when the point of intersection (A) with the perpendicular to the ground passing through said contact point (P) between the movement support and the ground is substantially coincident with the said contact point (P) or situated under said contact point (P);
the vehicle being designed, by its geometry and/or the presence of mechanical means associating the nacelle and the movement supports:
for causing, when the vehicle is running on a turn, an inclination of each of the movement supports to the inside of the turn, under the effect of centrifugal force, the cross-members remaining substantially parallel to the ground;
and for correcting the plumb, when the vehicle is travelling in a cant, the nacelle remaining horizontal and the mid-plane of the movement supports which is substantially vertical in the neutral position remaining substantially vertical.

11. The vehicle according to claim 10, characterized in that it comprises a coupling device between the nacelle and each of the movement supports, the coupling devices being arranged so that the pivoting of the nacelle drives the inclination of the movement supports and vice versa.

12. The vehicle according to claim 10, characterized in that the movement supports of at least one train are steered ones, the link system of each of these movement supports on the corresponding cross-member including a steering pivot having the at least one steering axis and allowing the steering of said movement supports, wherein the vehicle comprises a steering wheel mounted on the nacelle, capable of causing the steering of the steered movement supports through transmission means, characterized in that the transmission means between the steering wheel and the steered movement supports, and the control means of the steering of the movement supports of the second train, when they are present, comprise:
a rotary piece mounted on the nacelle freely in rotation about the hinge axis of the nacelle, the rotary piece being driven in rotation by a steering column which is connected to the steering wheel and which presents an axis offset relative to the hinge axis of the nacelle;
and, for each steered movement support, a steering connecting-rod presenting a first end connected to the rotary part at a distance from the hinge axis and a second end connected to the link system between said movement support and the corresponding cross-members;
the steering connecting-rods of a same train being disposed substantially symmetrically relative to the median longitudinal plane (P1) of the vehicle when the vehicle is in neutral position;

the direction of rotation of the rotary part, relative to the rotation direction of the steering wheel and the positioning of the steering connecting-rods being provided so that the transmission means and the control means are capable of compensating in a substantially exact way the steering induced by the inclination of the movement supports, by creating a reverse steering of the induced steering.

13. The vehicle according to claim 5, characterized in that, the movement supports are sliding supports capable of sliding on a snowy surface, and the vehicle further comprises an attachment member which projects from the sliding supports downwards, the attachment members being designed to be able to sink into the snow and prevent lateral skidding of the vehicle and for each of the sliding supports, the link system includes an inclination pivot having a substantially longitudinal inclination axis situated close to the contact surface between the sliding support and the ground, and in that the vehicle comprises a coupling device between the nacelle and each of the sliding supports, the coupling devices being arranged so that the pivoting of the nacelle causes the inclination of the sliding supports, and wherein the transmission means between the steering wheel and said movement support;

and the coupling device between the nacelle and said movement support;

are removably assembled to said movement support, so as to be capable of being temporarily disconnected from said movement support to allow rotating said movement support about the steering axis with a sufficient amplitude in order to release the access to the nacelle laterally.

14. The vehicle according to claim 1, characterized in that the link system between at least one cross-member and each of the corresponding movement supports further comprises a suspension device having a substantially transverse suspension axis, when the vehicle is in neutral position.

15. The vehicle according to claim 2, characterized in that, from the hinge axis of the nacelle toward a movement support, the link system comprises, in this order, the steering pivot, an inclination pivot and the suspension device.

16. The vehicle according to claim 9, characterized in that at least one link system comprises a universal joint forming the inclination and suspension axes.

17. The vehicle according to claim 1, characterized in that it comprises at least one electric motor and a battery capable of supplying the electric motor.

18. The vehicle according to claim 1, characterized in that the nacelle comprises a frame and a seat mounted on the frame, the frame including two lateral portions linked by a front portion and a rear portion, the front and rear portions extending upwards relative to the lateral portions, the hinge axis of the nacelle being disposed above the lateral portions.

19. The vehicle according to claim 5, characterized in that the link system between each of the steered movement supports of a train and the corresponding cross-member comprises a hinged arm whose first end is linked at an end of said cross-member and forms, with said end of said cross-member, a steering pivot and a second end of which is linked to said movement support and wherein said cross-member and said steering pivot are situated above said movement support.

20. The vehicle according to claim 19, characterized in that the movement supports are wheels or tracks and wherein the movement supports are sliding supports capable of sliding on a snowy surface, and in that the vehicle further comprises an attachment member which projects from the sliding supports downwards, the attachment members being designed to be able to sink into the snow and prevent lateral skidding of the vehicle.

* * * * *